(12) United States Patent
Amano et al.

(10) Patent No.: US 10,776,735 B2
(45) Date of Patent: *Sep. 15, 2020

(54) RISK INFORMATION PROCESSING METHOD AND SERVER DEVICE

(71) Applicant: PANASONIC INTELLECTUAL PROPERTY CORPORATION OF AMERICA, Torrance, CA (US)

(72) Inventors: Hiroshi Amano, Osaka (JP); Kimio Minami, Nara (JP); Toshihisa Nakano, Osaka (JP); Tohru Wakabayashi, Hyogo (JP); Takako Hirose, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,029

(22) Filed: Nov. 12, 2019

(65) Prior Publication Data

US 2020/0082311 A1 Mar. 12, 2020

Related U.S. Application Data

(63) Continuation of application No. 14/965,715, filed on Dec. 10, 2015, now Pat. No. 10,521,749.

(30) Foreign Application Priority Data

Dec. 26, 2014 (JP) .................................. 2014-266408
Sep. 7, 2015 (JP) .................................. 2015-175984

(51) Int. Cl.
*G06Q 10/06* (2012.01)
*G06F 16/23* (2019.01)
(Continued)

(52) U.S. Cl.
CPC ..... *G06Q 10/0635* (2013.01); *B60W 30/0956* (2013.01); *G06F 16/2358* (2019.01); (Continued)

(58) Field of Classification Search
CPC ....................................................... G06Q 10/06
See application file for complete search history.

(56) References Cited

U.S. PATENT DOCUMENTS 9,317,980 B2 4/2016 Cook et al.
2004/0267455 A1 12/2004 Hatano et al.
(Continued)

FOREIGN PATENT DOCUMENTS

EP 2560151 A1 2/2013
JP 2013-114365 A 6/2013
(Continued)

OTHER PUBLICATIONS

The Extended European Search Report dated Mar. 31, 2016 for European Patent Application No. 15199763.2.

*Primary Examiner* — Kurtis Gills
(74) *Attorney, Agent, or Firm* — Greenblum & Bernstein, P.L.C.

(57) ABSTRACT

A risk information processing method is used in a risk information processing system that manages a degree of risk at a target spot at which a moving object is located. The method includes: receiving sensor data collected at each of two spots different from the target spot; determining a degree of risk of an event at each of the two spots from the sensor data collected at each of the two spots; storing, as risk information the determined degree of risk associated with each of the two spots; estimating first risk information associated with the target spot without sensor data of first event at the target spot, by using the stored risk information, the first risk information being a degree of risk of the first event at the target spot; and outputting information for the target spot based on the estimated first risk information.

11 Claims, 28 Drawing Sheets

(51) Int. Cl.
*G06F 16/2457* (2019.01)
*G08G 1/01* (2006.01)
*B60W 30/095* (2012.01)
*G08G 1/16* (2006.01)
*G08G 1/0967* (2006.01)

(52) U.S. Cl.
CPC ..... *G06F 16/24578* (2019.01); *G08G 1/0112* (2013.01); *G08G 1/0129* (2013.01); *G08G 1/0133* (2013.01); *G08G 1/0141* (2013.01); *G08G 1/096716* (2013.01); *G08G 1/096741* (2013.01); *G08G 1/096775* (2013.01); *G08G 1/164* (2013.01)

(56) References Cited

U.S. PATENT DOCUMENTS

| | | | |
|---|---|---|---|
| 2007/0257815 A1* | 11/2007 | Gunderson | G08G 1/16 340/903 |
| 2010/0332131 A1* | 12/2010 | Horvitz | G01C 21/3484 701/414 |
| 2012/0123806 A1* | 5/2012 | Schumann, Jr. | G08G 1/096775 705/4 |
| 2012/0224057 A1 | 9/2012 | Gill et al. | |
| 2013/0226441 A1 | 8/2013 | Horita | |
| 2013/0238181 A1 | 9/2013 | James | |
| 2014/0088815 A1 | 3/2014 | Kitagishi et al. | |
| 2014/0114502 A1 | 4/2014 | Hugron et al. | |
| 2015/0127212 A1* | 5/2015 | Chacon | B60R 21/013 701/32.4 |
| 2015/0363984 A1 | 12/2015 | Garcia Manchado | |
| 2016/0169690 A1* | 6/2016 | Bogovich | G06Q 40/08 701/423 |

FOREIGN PATENT DOCUMENTS

| | | |
|---|---|---|
| JP | 2014-154004 A1 | 8/2014 |
| JP | 2014-238654 A | 12/2014 |

\* cited by examiner

FIG. 7

| | SITUATION a | SITUATION b | ... | SITUATION m | ... |
|---|---|---|---|---|---|
| SPOT A | 3 | 1 | ... | 3 | ... |
| SPOT B | 3 | 2 | ... | 3 | ... |
| ... | ... | ... | ... | ... | ... |
| SPOT N | 1 | 3 | ... | 1 | ... |
| ... | ... | ... | ... | ... | ... |

701

(OCCURRENCE OF RISK EVENT: 3, NON-OCCURRENCE OF RISK EVENT: 1, NON-EVALUATED: 2)

FIG. 8

| | SITUATION a | SITUATION b | ... | SITUATION m | ... |
|---|---|---|---|---|---|
| SPOT A | 3 | 1 | ... | 3 | ... |
| SPOT B | 3 | 2.75 | ... | 3 | ... |
| ... | ... | ... | ... | ... | ... |
| SPOT N | 1 | 3 | ... | 1 | ... |
| ... | ... | ... | ... | ... | ... |

801

(OCCURRENCE OF RISK EVENT: 3, NON-OCCURRENCE OF RISK EVENT: 1, NON-EVALUATED: 2)

FIG. 9

| | PRESENCE OF VEHICLE AHEAD WITHIN CERTAIN DISTANCE | PRESENCE OF VEHICLE BEHIND WITHIN CERTAIN DISTANCE | PRESENCE OF ONCOMING VEHICLE WITHIN CERTAIN DISTANCE | PRESENCE OF RAINY WEATHER | PRESENCE OF ROAD SURFACE FREEZING | THE NUMBER OF PEDESTRIANS WITHIN CERTAIN DISTANCE > THRESHOLD VALUE a | THE NUMBER OF BICYCLES WITHIN CERTAIN DISTANCE > THRESHOLD VALUE b | |
|---|---|---|---|---|---|---|---|---|
| SPOT A | 3 | 1 | 3 | 1 | 3 | 1 | 3 | ... |
| SPOT B | 3 | 2 | 3 | 1 | 3 | 2 | 3 | ... |
| ... | | | | | | | | ... |
| SPOT N | 1 | 3 | 1 | 3 | 1 | 3 | 1 | ... |
| SPOT O | 1 | 3 | 2 | 3 | 1 | 3 | 1 | ... |
| ... | | | | | | | | ... |

(OCCURRENCE OF RISK EVENT: 3, NON-OCCURRENCE OF RISK EVENT: 1, NON-EVALUATED: 2)

FIG. 10

| | PRESENCE OF VEHICLE AHEAD WITHIN CERTAIN DISTANCE | PRESENCE OF VEHICLE BEHIND WITHIN CERTAIN DISTANCE | PRESENCE OF ONCOMING VEHICLE WITHIN CERTAIN DISTANCE | PRESENCE OF RAINY WEATHER | PRESENCE OF ROAD SURFACE FREEZING | THE NUMBER OF PEDESTRIANS WITHIN CERTAIN DISTANCE > THRESHOLD VALUE a | THE NUMBER OF BICYCLES WITHIN CERTAIN DISTANCE > THRESHOLD VALUE b | |
|---|---|---|---|---|---|---|---|---|
| SPOT A | 3 | 3 | 3 | 1 | 3 | 1 | 3 | ... |
| SPOT B | 3 | 2.98 | 3 | 1 | 3 | 1.05 | 3 | ... |
| ... | | | | | | ... | | ... |
| SPOT N | 1 | 3 | 1 | 3 | 1 | 3 | 1 | ... |
| SPOT O | 1 | 3 | 1.12 | 3 | 1 | 3 | 1 | ... |
| ... | | | | | | | | ... |

1001

(OCCURRENCE OF RISK EVENT: 3, NON-OCCURRENCE OF RISK EVENT: 1, NON-EVALUATED: 2)

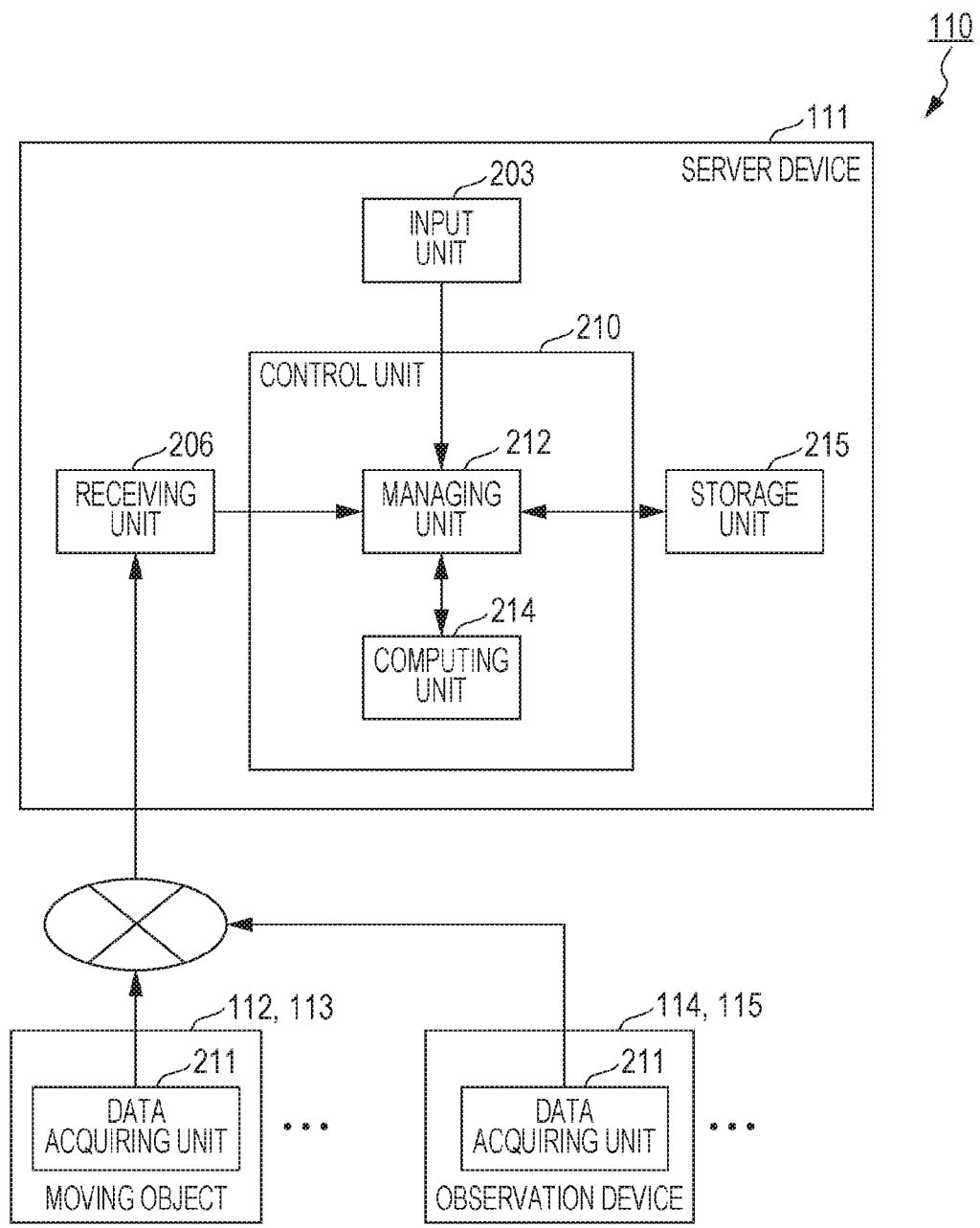

FIG. 16

| | PRESENCE OF VEHICLE AHEAD WITHIN CERTAIN DISTANCE | PRESENCE OF VEHICLE BEHIND WITHIN CERTAIN DISTANCE | PRESENCE OF ONCOMING VEHICLE WITHIN CERTAIN DISTANCE | PRESENCE OF RAINY WEATHER | PRESENCE OF ROAD SURFACE FREEZING | THE NUMBER OF PEDESTRIANS WITHIN CERTAIN DISTANCE > THRESHOLD VALUE a | THE NUMBER OF BICYCLES WITHIN CERTAIN DISTANCE > THRESHOLD VALUE b | ... |
|---|---|---|---|---|---|---|---|---|
| SPOT A | 3 | 1 | 3 | 1 | 3 | 1 | 3 | ... |
| SPOT B | 3 | 2.98 | 3 | 1 | 3 | 1.05 | 3 | ... |
| ... | ... | ... | ... | ... | ... | ... | ... | ... |
| SPOT N | 1 | 3 | 1 | 3 | 1 | 3 | 1 | ... |
| SPOT O | 1 | 3 | 1.12 | 3 | 1.08 | 3 | 1 | ... |
| ... | ... | ... | ... | ... | ... | ... | ... | ... |

(OCCURRENCE OF RISK EVENT: 3, NON-OCCURRENCE OF RISK EVENT: 1, NON-EVALUATED: 2)

| | PRESENCE OF VEHICLE AHEAD WITHIN CERTAIN DISTANCE | PRESENCE OF VEHICLE BEHIND WITHIN CERTAIN DISTANCE | PRESENCE OF ONCOMING VEHICLE WITHIN CERTAIN DISTANCE | PRESENCE OF RAINY WEATHER | PRESENCE OF ROAD SURFACE FREEZING | THE NUMBER OF PEDESTRIANS WITHIN CERTAIN DISTANCE > THRESHOLD VALUE a | THE NUMBER OF BICYCLES WITHIN CERTAIN DISTANCE > THRESHOLD VALUE b | |
|---|---|---|---|---|---|---|---|---|
| SPOT A | 3 | 2 | 2 | 2 | 2 | 2 | 2 | ... |
| SPOT B | 2 | 2 | 2 | 2 | 2 | 2 | 2 | ... |
| ... | ... | ... | ... | ... | ... | ... | ... | ... |
| SPOT N | 2 | 2 | 2 | 2 | 2 | 2 | 2 | ... |
| SPOT O | 2 | 2 | 2 | 2 | 2 | 2 | 2 | ... |
| ... | ... | ... | ... | ... | ... | ... | ... | ... |

1701

(OCCURRENCE OF RISK EVENT: 3, NON-OCCURRENCE OF RISK EVENT: 1, NON-EVALUATED: 2)

FIG. 18

| | PRESENCE OF VEHICLE AHEAD WITHIN CERTAIN DISTANCE | PRESENCE OF VEHICLE BEHIND WITHIN CERTAIN DISTANCE | PRESENCE OF ONCOMING VEHICLE WITHIN CERTAIN DISTANCE | PRESENCE OF RAINY WEATHER | PRESENCE OF ROAD SURFACE FREEZING | THE NUMBER OF PEDESTRIANS WITHIN CERTAIN DISTANCE > THRESHOLD VALUE a | THE NUMBER OF BICYCLES WITHIN CERTAIN DISTANCE > THRESHOLD VALUE b | |
|---|---|---|---|---|---|---|---|---|
| SPOT A | 2.7 | 0.9 | 2.7 | 0.9 | 2.7 | 0.9 | 2.7 | ... |
| SPOT B | 2.7 | 2.68 | 2.7 | 0.9 | 2.7 | 0.95 | 2.7 | ... |
| ... | ... | ... | ... | ... | ... | ... | ... | ... |
| SPOT N | 0.9 | 2.7 | 0.9 | 2.7 | 0.9 | 2.7 | 0.9 | ... |
| SPOT O | 0.9 | 2.7 | 1.0 | 2.7 | 0.97 | 2.7 | 0.9 | ... |
| ... | ... | ... | ... | ... | ... | ... | ... | ... |

1801

(OCCURRENCE OF RISK EVENT: 3, NON-OCCURRENCE OF RISK EVENT: 1, NON-EVALUATED: 2)

FIG. 22

|  | AMOUNT OF TRAFFIC | THE NUMBER OF ACCIDENTS |
|---|---|---|
| SPOT A | 1234 | 23 |
| SPOT B | 123 | 2 |
| ... | ... | ... |
| SPOT N | 1 | 0 |
| ... | ... | ... |

~2201

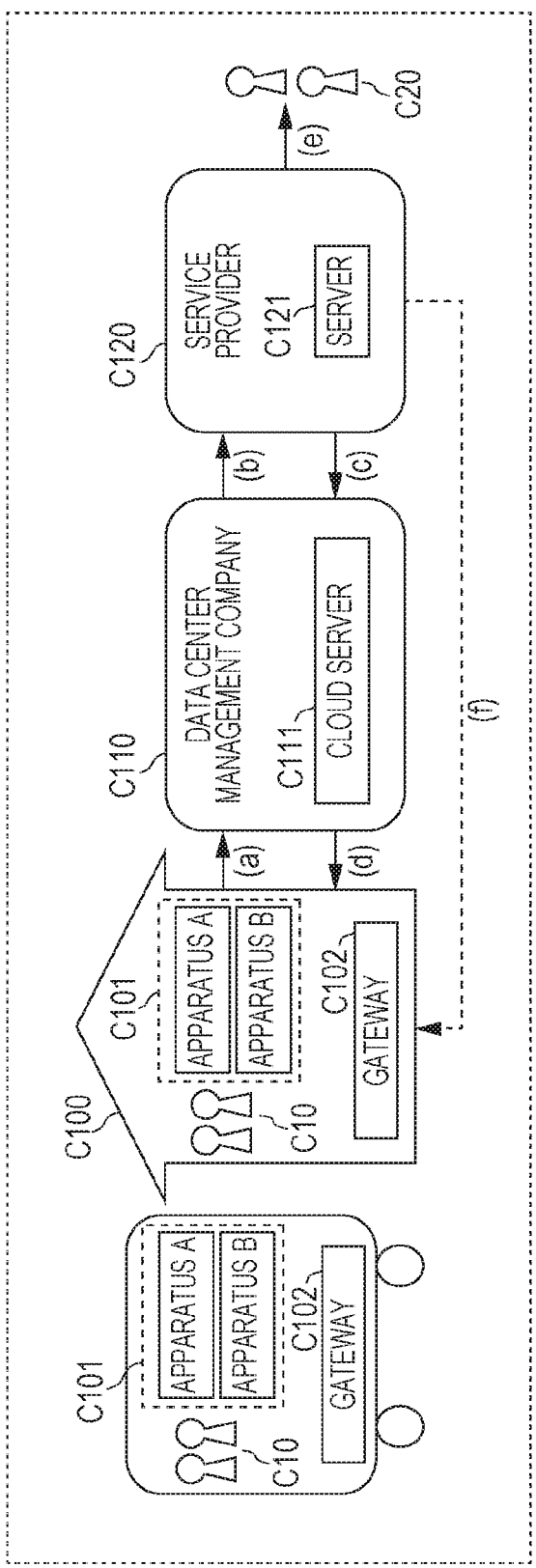
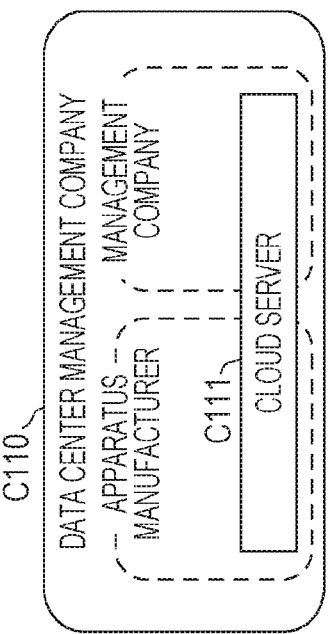
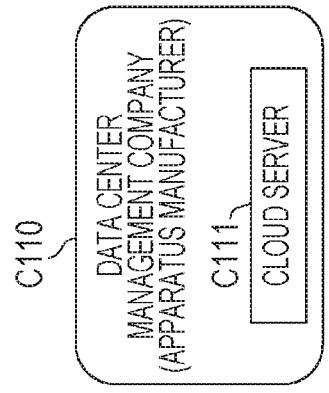
FIG. 25A
FIG. 25C
FIG. 25B

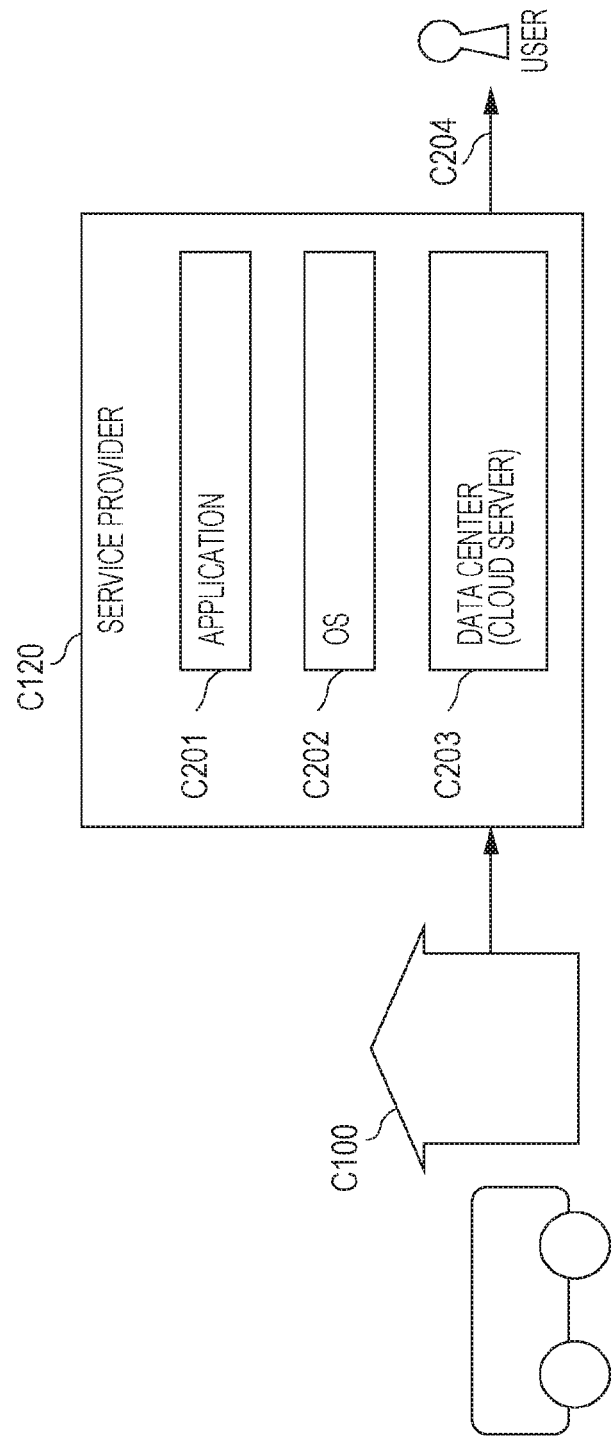

RISK INFORMATION PROCESSING METHOD AND SERVER DEVICE

CROSS REFERENCE TO RELATED APPLICATIONS

This application is a continuation application of pending U.S. application Ser. No. 14/965,715, filed Dec. 10, 2015, which claims the foreign priority benefit of JP 2014-266408, filed Dec. 26, 2014, and JP 2015-175984, filed Sep. 7, 2015. The entire disclosures of above-identified applications are incorporated herein by reference in their entirety.

BACKGROUND

1. Technical Field

The present disclosure relates to a technique of processing risk information. More specifically, the present disclosure relates to management of collected risk information at each spot.

2. Description of the Related Art

In recent years, various services are provided to a moving object such as a vehicle over a network. As one of conventional services, a risk information processing system that determines a spot at which the possibility of occurrence of an accident is high while a vehicle is moving and issues a warning is known (see, for example, Japanese Unexamined Patent Application Publication No, 2014-154004).

SUMMARY

In one general aspect, the techniques disclosed here feature a risk information processing method used in a risk information processing system that manages a degree of risk at a spot at which a moving object is located, including: storing, as risk information in a storage of the risk information processing system, a degree of risk that is input for a combination of a spot of occurrence of a risk event and a situation of occurrence of the risk event at the spot; and estimating first risk information which is a degree of risk for a first combination for which a degree of risk has not been input by calculation using three or more pieces of risk information stored in the storage; the three or more pieces of risk information including second risk information which is a degree of risk for a second combination whose spot is the same as the first combination and whose situation is different from the first combination, third risk information which is a degree of risk for a third combination whose situation is the same as the first combination and whose spot is different from the first combination, and fourth risk information which is a degree of risk for a fourth combination whose situation is the same as the second combination and whose spot is the same as the third combination.

According to the present disclosure, further improvements can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram for explaining a configuration of the overall observation table according to Embodiment 1;

FIG. 8 is a diagram for explaining a configuration of the overall estimation table according to Embodiment 1;

FIG. 9 is a diagram illustrating an example of the overall observation table according to Embodiment 1;

FIG. 10 is a diagram illustrating an example of the overall estimation table according to Embodiment 1;

FIG. 11 is a block diagram illustrating an example of a configuration of a risk information processing system that achieves a risk information processing method according to Embodiment 2;

FIG. 16 is a diagram illustrating an example of the overall estimation table according to Embodiment 2;

FIG. 17 is a diagram illustrating an example of the individual observation table according to Embodiment 2;

FIG. 18 is a diagram illustrating an example of the individual estimation table according to Embodiment 2;

FIG. 22 is a diagram illustrating an example of the event frequency table according to Embodiment 3;

FIG. 25A is a diagram illustrating an example of a risk information processing system;

FIG. 25B is a diagram illustrating an example of a risk information processing system;

FIG. 25C is a diagram illustrating an example of a risk information processing system;

FIG. 26 is an overall view illustrating an example of a risk information processing system;

DETAILED DESCRIPTION

Figure 1:
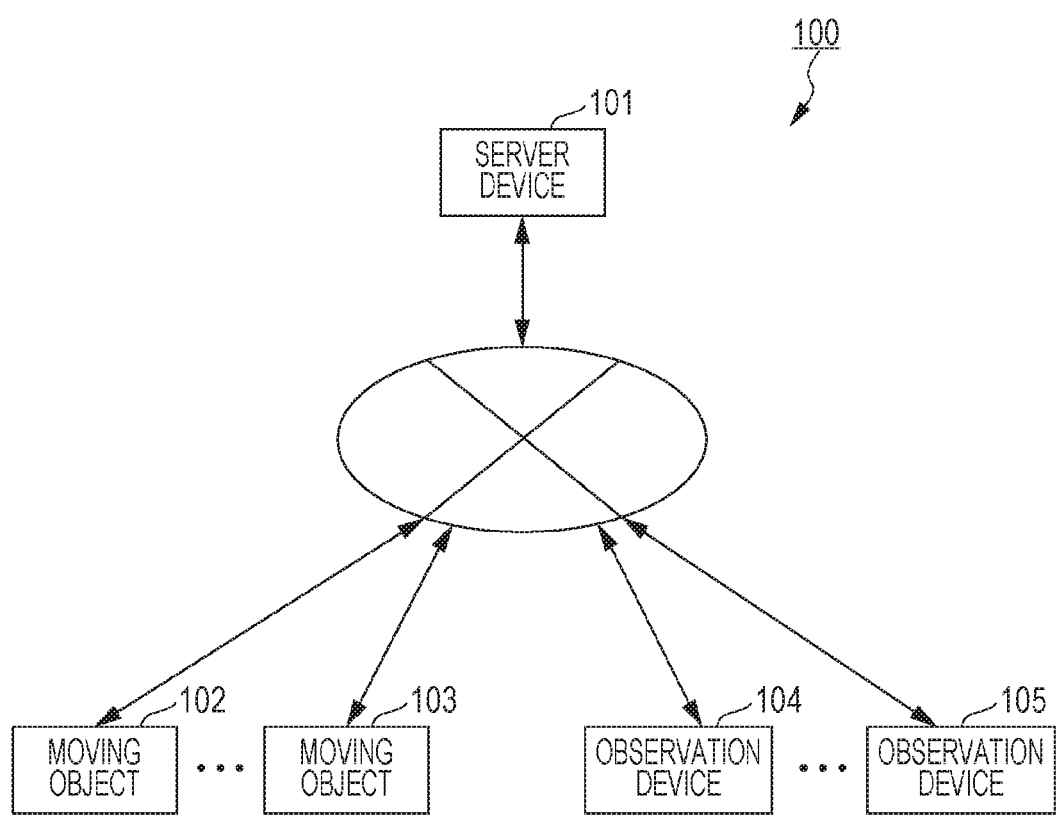
FIG. 1 is a diagram illustrating an example of an overall configuration of a risk information processing system according to an embodiment.

Underlying Knowledge Forming Basis of the Present Disclosure

The conventional risk information processing system needs further improvements. The inventors of the present invention found that the following problems occur in the risk information processing system described in BACKGROUND.

In recent years, a safety driving support system that supports safety driving of a vehicle has been developed. In such a safety driving support system, a vehicle acquires information on a region ahead from a distance sensor or the like while traveling on a road. The vehicle performs a control operation such as automatic braking by using the acquired information so that a traffic accident does not occur, in a case where a distance to an obstacle ahead becomes equal to or shorter than a certain distance.

However, in a case where a vehicle which is a subject of safety driving support controls driving based on only information acquired by a sensor mounted in this vehicle, it is conventionally difficult to warn a driver before the vehicle reaches a dangerous situation.

For example, the risk information processing system of Japanese Unexamined Patent Application Publication No. 2014-154004 discloses the following technique. According to the technique, an image is captured and recorded at certain time intervals by using a camera of a tablet terminal while a driver is driving a vehicle. Furthermore, operation information and behavior information which are results of detection of driving operation and behavior of the vehicle during driving are recorded. Risk factors that can be causes of risk such as an accident at a target spot are acquired from the images, operation information, and behavior information thus acquired. Then, the type of risk about which the driver should be warned is statistically determined based on the acquired risk factors, and risk information at the target spot is registered in map data. This makes it possible to acquire potential risk information in advance.

The risk information processing system of Japanese Unexamined Patent Application Publication No. 2014-154004 calculates, for each risk type, a statistical degree of risk indicative of the statistical possibility of occurrence of risk of the risk type on the basis of individual degrees of risk in a certain road section, a certain time zone, and the risk type. A statistical degree of risk of a certain risk type is statistically calculated based on risk factors obtained from images and behavior and operation information in a certain road section and in a certain time zone. That is, Japanese Unexamined Patent Application Publication No. 2014-154004 has a problem that in a case where a degree of risk in a wide area in which vehicles travel is to be calculated, the degree of risk cannot be calculated unless all risk factors and all risk types are actually sensed in all road sections included in the area and in all time zones. Furthermore, there is a problem that although a degree of risk varies depending on the driver even if the degree of risk is of the same road section, the same time zone, and the same risk type, this is not considered in Japanese Unexamined Patent Application Publication No. 2014-154004.

In view of the above discussion, the inventors of the present invention considered the following improvements in order to solve the above problems.

A risk information processing method according to one aspect of the present disclosure is a risk information processing method used in a risk information processing system that manages a degree of risk at a spot at which a moving object is located, including: storing, as risk information in a storage of the risk information processing system, a degree of risk that is input for a combination of a spot of occurrence of a risk event and a situation of occurrence of the risk event at the spot; and estimating first risk information which is a degree of risk for a first combination for which a degree of risk has not been input by calculation using three or more pieces of risk information stored in the storage; the three or more pieces of risk information including second risk information which is a degree of risk for a second combination whose spot is the same as the first combination and whose situation is different from the first combination, third risk information which is a degree of risk for a third combination whose situation is the same as the first combination and whose spot is different from the first combination, and fourth risk information which is a degree of risk for a fourth combination whose situation is the same as the second combination and whose spot is the same as the third combination.

This makes it possible to estimate the degree of risk for the first combination for which a degree of risk has not been input from a combination of a spot and a situation for which a degree of risk has been acquired. It is therefore possible to acquire degrees of risk without actually acquiring sensing data for all managed combinations of spots and situations.

For example, the risk information processing method may be arranged such that in the estimating, correlation of degrees of risk between spots is calculated by using the second risk information and the fourth risk information, and the degree of risk for the first combination is calculated from the degree of risk of the third risk information by using the calculated correlation of degrees of risk between the spots.

For example, the risk information processing method may be arranged such that in the estimating, correlation of degrees of risk between situations is calculated by using the third risk information and the fourth risk information, and the degree of risk for the first combination is calculated from the degree of risk of the second risk information by using the calculated correlation of degrees of risk between the situations.

For example, the risk information processing method may be arranged such that the first risk information obtained in the estimating is stored in the storage.

Therefore, the estimated degree of risk can be held in the storage.

For example, the risk information processing method may be arranged to further include storing, in the storage as individual risk information for an individual driver and as overall risk information for all drivers, a degree of risk for the driver that is input for a combination of a spot of occurrence of a risk event and a situation of occurrence of the risk event at the spot; calculating correlation of degrees of risk between the individual risk information and the overall risk information; and calculating a degree of risk of the individual risk information from the degree of risk of the overall risk information by using the calculated correlation of degrees of risk between the individual risk information and the overall risk information.

This makes it possible to specify a driver and obtains an individual degree of risk for the specified driver by using a degree of risk for a combination of a spot and a situation for all drivers. It is therefore possible to acquire a degree of risk for an individual driver without actually acquiring, for each driver, all sensing data for all managed combinations of spots and situations.

For example, the risk information processing method may be arranged to further include storing, in the storage, frequency information in which frequencies of a traffic event and spots are associated with each other; determining an order of processing of the spots by using the frequency information; and determining the first risk information to be processed in accordance with the order of processing in the estimating.

It is therefore possible to obtain an estimated evaluation value at a spot at which the frequency of a traffic event is high such as a spot at which the amount of traffic is large without waiting for estimation of a degree of risk for a combination for which a degree of risk has not been input among all combinations.

For example, the risk information processing method may be arranged to further include storing, in the storage, frequency information in which frequencies of driving of drivers and the driver are associated with each other; determining an order of processing of the drivers by using the frequency information; and determining the individual risk information to be processed in accordance with the order of processing in the calculating the degree of risk of the individual risk information.

It is therefore possible to obtain individual risk information for a driver whose frequency of driving without waiting for estimation of a degree of risk for a combination for which a degree of risk has not been input among all combinations.

For example, the risk information processing method may be arranged to further include receiving positional information indicative of a current position and sensor data indicative of a current situation from the moving object; acquiring a degree of risk for a combination of a spot indicated by the received positional information and a situation indicated by the sensor data from the storage; and transmitting information based on the acquired degree of risk to the moving object.

This makes it possible to notify a user who is driving the moving object of a degree of risk at a current spot in real time.

For example, the risk information processing method may be arranged to further include in a case where the acquired degree of risk exceeds a threshold value that is held in advance, determining that warning is presented and transmitting the information based on the acquired degree of risk to the moving object; and in a case where the acquired degree of risk is equal to or lower than the threshold value, determining that the warning is not presented and transmitting no information based on the acquired degree of risk to the moving object.

For example, the risk information processing method may be arranged such that any of the storing the input degree of risk in the storage and the estimating the first risk information is performed by a processor provided in the risk information processing system.

A server device according to one aspect of the present disclosure is a server device that manages a degree of risk at a spot at which a moving object is located, including: a storage in which risk information indicative of a degree of risk for each combination of a spot and a situation is stored; a receiver that receives a degree of risk that is input for a combination of a spot of occurrence of a risk event and a situation of occurrence of the risk event at the spot; and a controller that stores the degree of risk received by the receiver in the storage as the risk information, the controller estimating first risk information which is a degree of risk for a first combination for which a degree of risk has not been input by calculation using three or more pieces of risk information stored in the storage; the three or more pieces of risk information including second risk information which is a degree of risk for a second combination whose spot is the same as the first combination and whose situation is different from the first combination, third risk information which is a degree of risk for a third combination whose situation is the same as the first combination and whose spot is different from the first combination, and fourth risk information which is a degree of risk for a fourth combination whose situation is the same as the second combination and whose spot is the same as the third combination.

This makes it possible to estimate the degree of risk for the first combination for which a degree of risk has not been input from a combination of a spot and a situation for which a degree of risk has been acquired. It is therefore possible to acquire degrees of risk without actually acquiring sensing data for all managed combinations of spots and situations.

It should be noted that general or specific embodiments may be implemented as a system, a method, an integrated circuit, a computer program, computer-readable storage medium such as a CD-ROM, or any selective combination thereof.

The present disclosure discloses a method for calculating a degree of risk at a position at which sensing has not been performed by sensing some risk factors in some road sections in some time zones.

The inventors of the present invention accomplished the aspects of the present disclosure based on the above discussion.

Risk information processing systems according to embodiments of the present disclosure are described with reference to the drawings.

The embodiments described below are preferable specific examples of the present disclosure. That is, numerical values, shapes, materials, constituent elements, the way in which the constituent elements are disposed and connected, steps, the order of steps, and the like described in the embodiments below are examples of the present disclosure and do not limit the present disclosure. The present disclosure is defined based on the recitation of the claims. Among the constituent elements in the embodiments below, constituent elements that are not described in the independent claims that show highest concepts of the present disclosure are not necessarily needed to accomplish the object of the present disclosure but are described as constituent elements for a more preferable embodiment.

Overview of Provided Service

FIG. 25A illustrates an overview of an information providing system according to the present embodiment. As one of services of the information providing system illustrated in FIG. 25A to 25C, a risk information processing system that manages collected risk information at each spot is provided.

A group C100 is, for example, a company, an organization, a house, a roadside device, or a vehicle, and the scale thereof is not limited. In the group C100, apparatuses A and B, which are a plurality of apparatuses C101, and a gateway C102 exist. The plurality of apparatuses C101 include apparatuses that are connectable to the Internet (e.g., a smartphone, a PC, and a TV) and apparatuses that are not connectable to the Internet by themselves (e.g., illumination, a washing machine, a refrigerator, and a car navigation). The plurality of apparatuses C101 may include apparatuses that are not connectable to the Internet by themselves but are connectable to the Internet via the gateway C102. Furthermore, a user C10 whose uses the plurality of apparatuses C101 exists in the group C100.

A cloud server C111 exists in a data center management company C110. The cloud server C111 is a virtual server that is linked with various apparatuses via the Internet. The cloud server C111 mainly manages enormous data (big data) or the like that is difficult to handle by a general database management tool or the like. For example, the data center management company C110 manages the data and the cloud server C111 and manages a data center for managing the data and the cloud server C111. Details of services provided by the data center management company C110 will be described later. The data center management company C110 is not limited to a company that is in charge of only management of the data, the cloud server C111, and the like. For example, in a case where an apparatus manufacturer that develops or manufactures one of the plurality of apparatuses C101 is also in charge of management of data, management of the cloud server C111, and the like, the apparatus manufacturer is the data center management company C110 (FIG. 25B). The data center management company C110 is not limited to a single company. For example, in a case where an apparatus manufacturer and a management company are jointly in charge of data management and management of the cloud server C111 or separately in charge of data management and management of the cloud server C111, both of or one of the apparatus manufacturer and the other management company are (is) the data center management company C110 (FIG. 25C).

A service provider C120 has a server C121. The server C121 can be a server of any scale and encompasses, for example, a memory of a personal PC and the like. There are cases where the service provider C120 does not have the server C121.

Note that the gateway C102 is not essential in the service. For example, in a case where the cloud server C111 is in charge of management of all data, the gateway C102 is unnecessary. Furthermore, there are cases where there is no apparatus that is not connectable to the Internet by itself such as a case where all apparatuses in a house are connected to the Internet.

Next, a flow of information in the service is described.

First, the apparatus A or the apparatus B of the group C100 transmits log information to the cloud server C111 of the data center management company C110. The cloud server C111 accumulates the log information of the apparatus A or the apparatus B ((a) of FIG. 25A). The log information is, for example, information indicative of an operation state, the time and date of operation, and the like of the plurality of apparatuses C101. For example, the log information is a history of viewing of TV and information of timer recording of a recorder, the date and time of operation of a washing machine and the amount of laundry, the date and time of opening and closing and the number of times of opening and closing of a refrigerator, and the like, but is not limited to these pieces of information. The log information refers to all kinds of information that can be acquired from any kinds of apparatuses. The log information may be directly provided to the cloud server C111 from the plurality of apparatuses C101 themselves via the Internet. Alternatively, the log information may be supplied to the gateway C102 and accumulated in the gateway C102 once and then be provided to the cloud server C111 from the gateway C102.

Next, the cloud server C111 of the data center management company C110 provides the accumulated log information to the service provider C120 by a constant unit. The unit may be a unit by which the information accumulated by the data center management company can be provided to the service provider C120 in an organized manner or may be a unit requested by the service provider C120. The unit need not be constant and the amount of provided information may change depending on a situation. The log information is stored in the server C121 of the service provider C120 as needed ((b) of FIG. 25A). Then, the service provider C120 organizes the log information in a manner suitable for a service provided to a user and then provides the information to the user. The user may be the user C10 who uses the plurality of apparatuses C101 or may be an outside user C20. The service may be, for example, directly provided to the user from the service provider ((b) and (e) of FIG. 25A). Alternatively, the service may be, for example, provided to the user via the cloud server C111 of the data center management company C110 ((c) and (d) of FIG. 25A). The cloud server C111 of the data center management company C110 may organize the log information in a manner suitable for the service provided to the user and then provide the log information to the service provider C120.

Note that the user C10 and the user C20 may be different from each other or may be the same as each other.

Embodiments according to one aspect of the present disclosure are described below with reference to the drawings.

Embodiment 1

FIG. 1 is a diagram illustrating an example of an overall configuration of a risk information processing system 100 according to Embodiment 1. The risk information processing system 100 illustrated in FIG. 1 includes a server device 101, a moving object 102, a moving object 103, an observation device 104, and an observation device 105.

The server device 101, the moving object 102, the moving object 103, the observation device 104, and the observation device 105 are connected so as to be communicable with each other via a communication network. The communication network can be, for example, the Internet. Accordingly, the server device 101, the moving object 102, the moving object 103, the observation device 104, and the observation device 105 transmit and receive various kinds of data by using a communication protocol such as TCP/IP.

In the present embodiment, the server device 101 receives positional information and sensor data from the moving object 102, the moving object 103, the observation device 104, or the observation device 105. The server device 101 records an overall observation table in which evaluation values indicative of occurrence or non-occurrence of a risk event are associated, as degrees of risk, with combinations of spots indicated by the received positional information and situations indicated by the sensor data. The server device 101 estimates a degree of risk (estimated evaluation value) for a combination of a spot and a situation that is not recorded in the overall observation table by using the overall observation table.

The moving object 102 and the moving object 103 are, for example, a four-wheel vehicle, a two-wheel vehicle, a mobile terminal, or the like. In the present embodiment, each of the moving object 102 and the moving object 103 acquires positional information indicative of a current position of the moving object and other sensor data such as the state of the moving object itself and a surrounding situation. Each of the moving object 102 and the moving object 103 transmits the acquired positional information and sensor data to the server device 101.

The observation device 104 and the observation device 105 are, for example, an ETC (Electronic Toll Collection System) roadside device, a DSRC (Dedicated Short Range Communication) roadside device, or the like. In the present embodiment, each of the observation device 104 and the observation device 105 acquires positional information indicative of a current position of the observation device and other sensor data such as the state of the observation device itself and a surrounding situation. Each of the observation device 104 and the observation device 105 transmits the acquired positional information and sensor data to the server device 101.

In FIG. 1, only two moving objects, i.e., the moving object 102 and the moving object 103 are illustrated. However, the number of moving objects may be one, three, or more. In FIG. 1, only two observation devices, i.e., the observation device 104 and the observation device 105 are illustrated. However, the number of observation devices may be one, three, or more.

Figure 2:
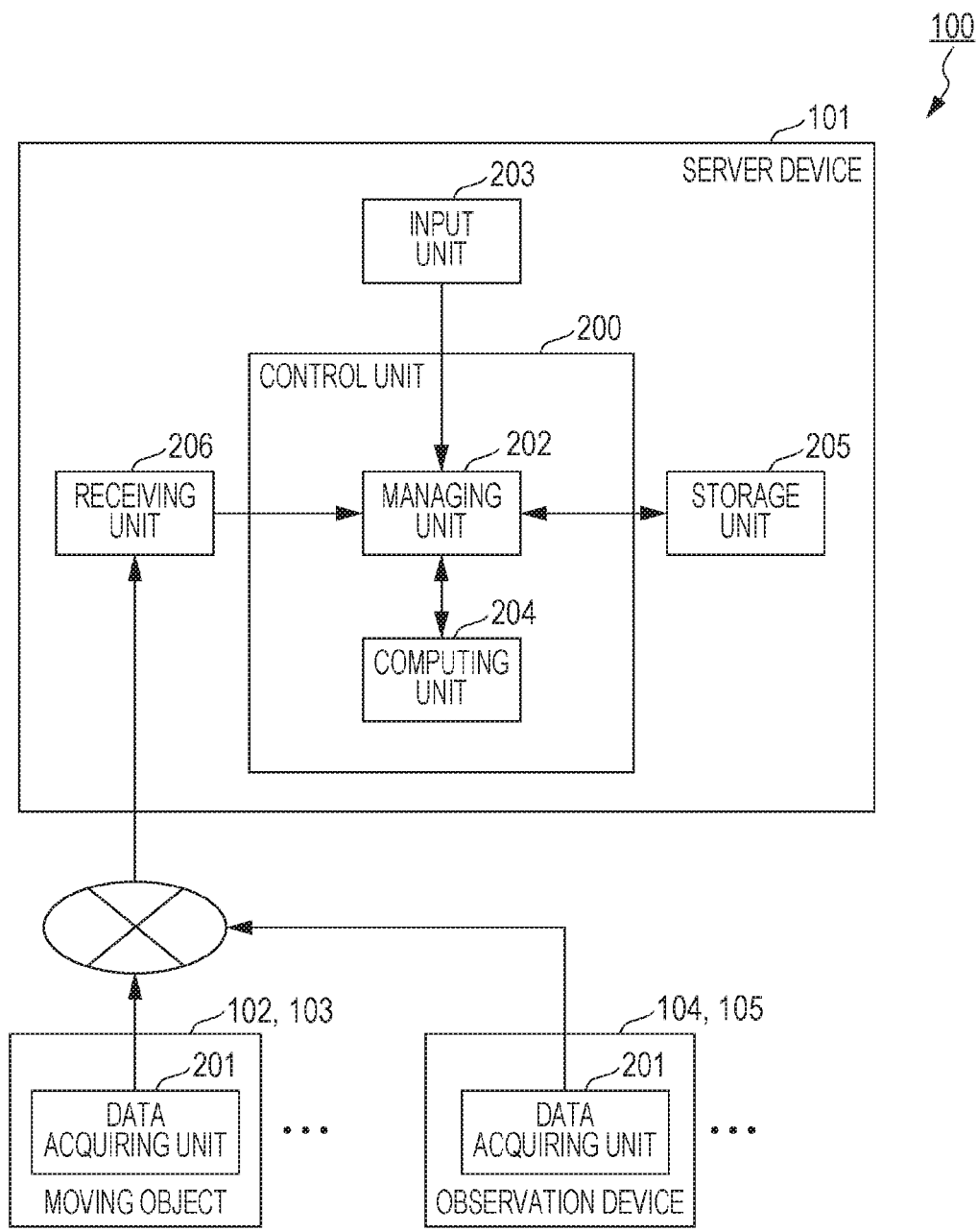
FIG. 2 is a block diagram illustrating an example of a configuration of a risk information processing system that achieves a risk information processing method according to Embodiment 1.

FIG. 2 is a block diagram illustrating an example of a configuration of the risk information processing system 100 that achieves a risk information processing method according to Embodiment 1. In the risk information processing system 100 illustrated in FIG. 2, the moving object 102 that acquires and transmits positional information and other sensor data such as a surrounding situation and the server device 101 that has a function of a risk information processing device are connected to each other over a network. The server device 101 is, for example, realized by a computer including a CPU (Central Processing Unit), a ROM (Read Only Memory), a RAM (Random Access Memory), and the like.

Each of the moving object 102 and the moving object 103 includes a data acquiring unit 201. Each of the observation device 104 and the observation device 105 includes a data acquiring unit 201. The following discusses the moving object 102, but the moving object 102 may be replaced with the moving object 103, the observation device 104, or the observation device 105 in the following description.

The data acquiring unit 201 senses a surrounding situation of the moving object 102 and acquires positional information indicative of a current position and sensor data indicative of a situation such as the state of the moving object 102 itself or the surrounding situation of the moving object 102. The data acquiring unit 201 transmits the acquired positional information and sensor data to the server device 101. The data acquiring unit 201 includes, for example, position acquiring means such as a GPS (Global Positioning System) that acquires positional information and sensor devices that acquire sensor data such as an on-board camera, a laser radar, a millimeter-wave radar, a sonar, an infrared camera, a road-surface condition sensor, a sleepiness sensor, and a weather sensor. Then, the data acquiring unit 201 acquires the positional information acquired by the position acquiring means and the sensor data acquired by the sensor devices. Furthermore, the data acquiring unit 201 includes CAN (Controller Area Network) information acquiring means, inter-vehicle communication information means, roadside-to-vehicle communication information means, vehicle surrounding information, and the like, and acquires the positional information acquired by the position acquiring means and the sensor data acquired by the sensor devices through communication or recognition.

For example, the data acquiring unit 201 may include an on-board camera and acquire, as the sensor data, the presence or absence of a vehicle ahead which is a result obtained by image recognition processing of a taken image and a distance to the vehicle ahead measured by using the taken image. The data acquiring unit 201 may include an on-board camera and a millimeter-wave radar and acquire, as the sensor data, the measured number of pedestrians within a certain distance. The data acquiring unit 201 may include a road-surface condition sensor and acquire, as the sensor data, the presence or absence of road surface freezing measured by the road-surface condition sensor. The data acquiring unit 201 may include a weather sensor and acquire, as the sensor data, whether the weather is rainy or not measured by the weather sensor. The kind of sensor data is not limited to a specific one.

The sensor data acquired by the data acquiring units 201 of the moving object 102, the moving object 103, the observation device 104, and the observation device 105 may be different from or the same as one another.

The server device 101 includes a control unit 200, an input unit 203, a storage unit 205, and a receiving unit 206. The server device 101 has a function as a risk information processing device.

The receiving unit 206 receives the positional information and the sensor data from the moving objects 102 and 103 or the observation devices 104 and 105. The receiving unit 206 notifies the control unit 200 of the received positional information and sensor data (transmits the received positional information and sensor data to the control unit 200).

The control unit 200 includes a managing unit 202 and a computing unit 204.

The managing unit 202 generates an overall observation table in which evaluation values indicative of occurrence or non-occurrence of a risk event are associated with combinations of spots and situations, and then stores the overall observation table in the storage unit 205. The overall observation table is, for example, made up of pieces of risk information that are degrees of risk for respective combinations of spots (rows) indicated by the positional information and situations (columns) indicated by sensor data. Note that the plurality of pieces of risk information that are degrees of risk associated with the respective plurality of combinations are stored in the storage unit 205 as the overall observation table, but need not be stored as a table. The plurality of pieces of risk information may be information expressed in a form other than a table, as long as the plurality of pieces of risk information are information on correspondences between the combinations and the degrees of risk.

The managing unit 202 causes an evaluation value (an evaluation value (degree of risk) indicative of occurrence or non-occurrence of a risk event) for a combination of a spot indicated by positional information and a situation indicated by sensor data to be recorded in a cell of the combination in the overall observation table stored in the storage unit 205 by using the positional information and sensor data acquired from the receiving unit 206 or occurrence or non-occurrence of a risk event acquired from the input unit 203. Occurrence or non-occurrence of a risk event is, for example, occurrence or non-occurrence of an accident. Occurrence or non-occurrence of a risk event may be, for example, occurrence or non-occurrence of a near miss.

Furthermore, the managing unit 202 generates an overall estimation table in which estimated degrees of risk (estimated evaluation values indicative of occurrence or non-occurrence of a risk event) are associated with respective combinations of spots and situations by using the overall observation table, and then stores the overall estimation table in the storage unit 205. The overall estimation table is, for example, made up of pieces of risk information indicative of degrees of risk including estimated evaluation values as degrees of risk for combinations of spots (rows) indicated by the positional information and situations (columns) indicated by the sensor data. The managing unit 202 calculates estimated evaluation values in cells (hereinafter referred to as "non-evaluated cells") corresponding to combinations of spots and situations for which degrees of risk are not held in the overall observation table by using degrees of risk held in cells corresponding to the other combinations of spots and situations in the overall observation table. Specifically, when calculating the estimated evaluation values, the managing unit 202 instructs the computing unit 204 to perform computation, and calculates the estimated evaluation values by using the computation result obtained by the computing unit 204. A calculation procedure of the estimated evaluation values will be described later in detail with reference to the drawings. The managing unit 202 causes the evaluation values in the cells (hereinafter referred to as "evaluated cells") corresponding to the combinations of spots and situations for which evaluation values are held in the overall observation table to be stored in corresponding cells of the overall estimation table as they are. Furthermore, the managing unit 202 causes the estimated evaluation values calculated for the non-evaluated cells by using the computing unit 204 to be stored in corresponding cells of the overall estimation table.

The computing unit 204 has a function of specifying a spot by using positional information received from the receiving unit 206 and a function of determining a situation by using sensor data received from the receiving unit 206 on the basis of a predetermined condition. In a case where there are a plurality of situations, a corresponding plurality of conditions are associated with the respective plurality of situations. Furthermore, the computing unit 204 has a function of calculating a coefficient of correlation of degrees of risk between spots and a function of calculating an estimated evaluation value in a non-evaluated cell in accordance with an instruction from the managing unit 202. The function of calculating a coefficient of correlation and the function of calculating an estimated evaluation value will be described later in detail with reference to the drawings. The computing unit 204 may have a function of determining whether or not an accident has occurred, for example, based on operation data of an ABS (Antilock Brake System) device among the sensor data received from the receiving unit 206 and accepting the result of determination as occurrence or non-occurrence of a risk event.

The input unit 203 accepts input of occurrence or non-occurrence of a risk event. The input unit 203 transmits the accepted occurrence or non-occurrence of a risk event to the control unit 200. For example, the input unit 203 is a device such as a keyboard or a mouse and accepts input of occurrence or non-occurrence of a risk event in response to operators operation.

The storage unit 205 stores therein, as an overall observation table, risk information which is information on correspondences between evaluation values indicative of occurrence or non-occurrence of a risk event and combinations of spots and situations. Furthermore, the storage unit 205 stores therein, as an overall estimation table, risk information which is information on correspondences between estimated evaluation values and combinations of spots and situations.

The configuration of the risk information processing system 100 according to the present embodiment has been described above.

Next, operation of the risk information processing system 100 according to the present embodiment is described below.

Figure 3:
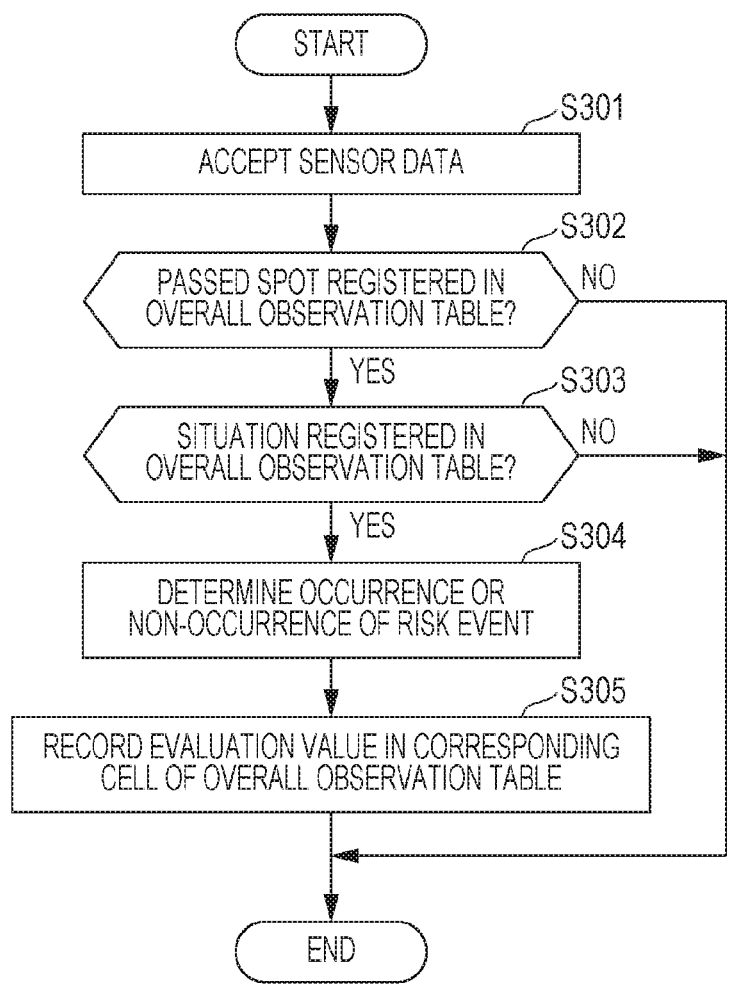
FIG. 3 is a flow chart illustrating an example of a processing procedure for recording an evaluation value in an overall observation table according to Embodiment 1.

FIG. 3 is a flow chart illustrating an example of a processing procedure for recording an evaluation value in an overall observation table in the risk information processing system 100 according to Embodiment 1.

As illustrated in FIG. 3, the receiving unit 206 receives positional information and sensor data from the moving objects 102 and 103 and the observation devices 104 and 105, and then transmits the received positional information and sensor data to the control unit 200. The control unit 200 accepts input of the positional information and the sensor data (Step S301).

Next, the managing unit 202 of the control unit 200 determines whether or not the moving objects 102 and 103 have passed a spot registered in an overall observation table by using the received positional information (Step S302). In a case where it is determined that a spot indicated by the received positional information is included in rows of spots registered in the overall observation table, the managing unit 202 determines that the moving objects 102 and 103 have passed the registered spot. In a case where the spot indicated by the input positional information is not included in the rows of the spots registered in the overall observation table (No in Step S302), the processing is finished.

In a case where it is determined that the moving objects 102 and 103 have passed the spot registered in the overall observation table (Yes in Step S302), the managing unit 202 determines whether or not a situation of a moving object or a surrounding situation of an observation device that acquired the sensor data is a situation registered in the overall observation table by using the sensor data received together with the positional information indicative of the spot (Step S303). Specifically, the managing unit 202 causes the computing unit 204 to determine whether or not the received sensor data satisfies a predetermined condition for determining whether or not the situation is a situation registered in the overall observation table. Then, in a case where it is determined as a result of determination in the computing unit 204 that the predetermined condition is satisfied, the managing unit 202 determines that the situation of the moving object or the surrounding situation of the observation device that acquired the received sensor data is a situation registered in the overall observation table. That is, the received sensor data indicates that the situation of the moving object or the surrounding situation of the observation device that acquired the received sensor data is a situation registered in the overall observation table.

Meanwhile, in a case where it is determined as a result of determination in the computing unit 204 that the received sensor data does not satisfy the predetermined condition, the managing unit 202 determines that the situation of the moving object or the surrounding situation of the observation device that acquired the received sensor data is not a situation registered in the overall observation table (No in Step S303), and the processing is finished.

In a case where it is determined that the situation of the moving object or the surrounding situation of the observation device that acquired the received sensor data is a situation registered in the overall observation table (Yes in Step S303), the managing unit 202 determines an evaluation value (an evaluation value indicative of occurrence or non-occurrence of a risk event) for a combination of the spot indicated by the positional information and the situation indicated by the sensor data in accordance with occurrence or non-occurrence of a risk event acquired from the input unit 203 (Step S304).

Then, the managing unit 202 records the determined evaluation value in a cell corresponding to the combination in the overall observation table (Step S305), and then the processing is finished.

The processing procedure for recording an evaluation value in the overall observation table in the risk information processing system 100 has been described above. That is, in the risk information processing system 100, a degree of risk that is input for a combination of a spot of occurrence of a risk event and a situation of occurrence of the risk event at the spot is stored as risk information in the storage unit 205.

Figure 4:
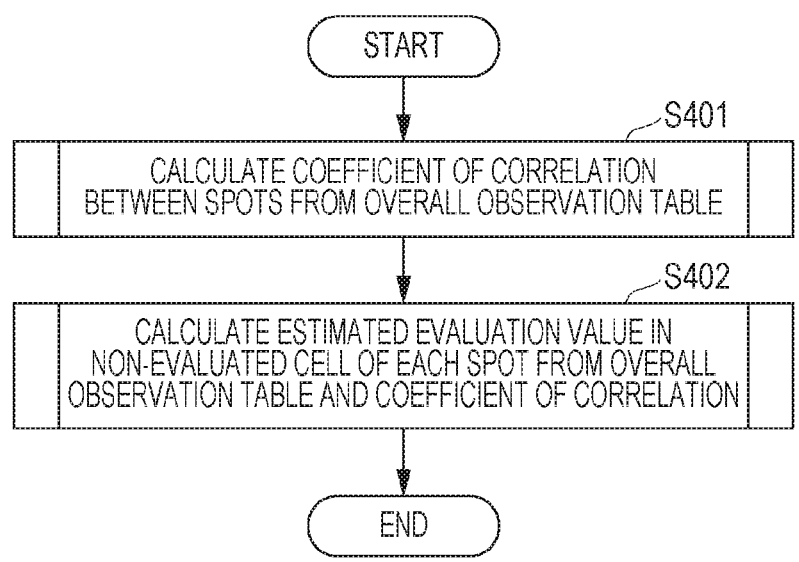
FIG. 4 is a flow chart illustrating an example of a processing procedure for recording an estimated evaluation value in the overall estimation table in the risk information processing system according to Embodiment 1.
Figure 5:
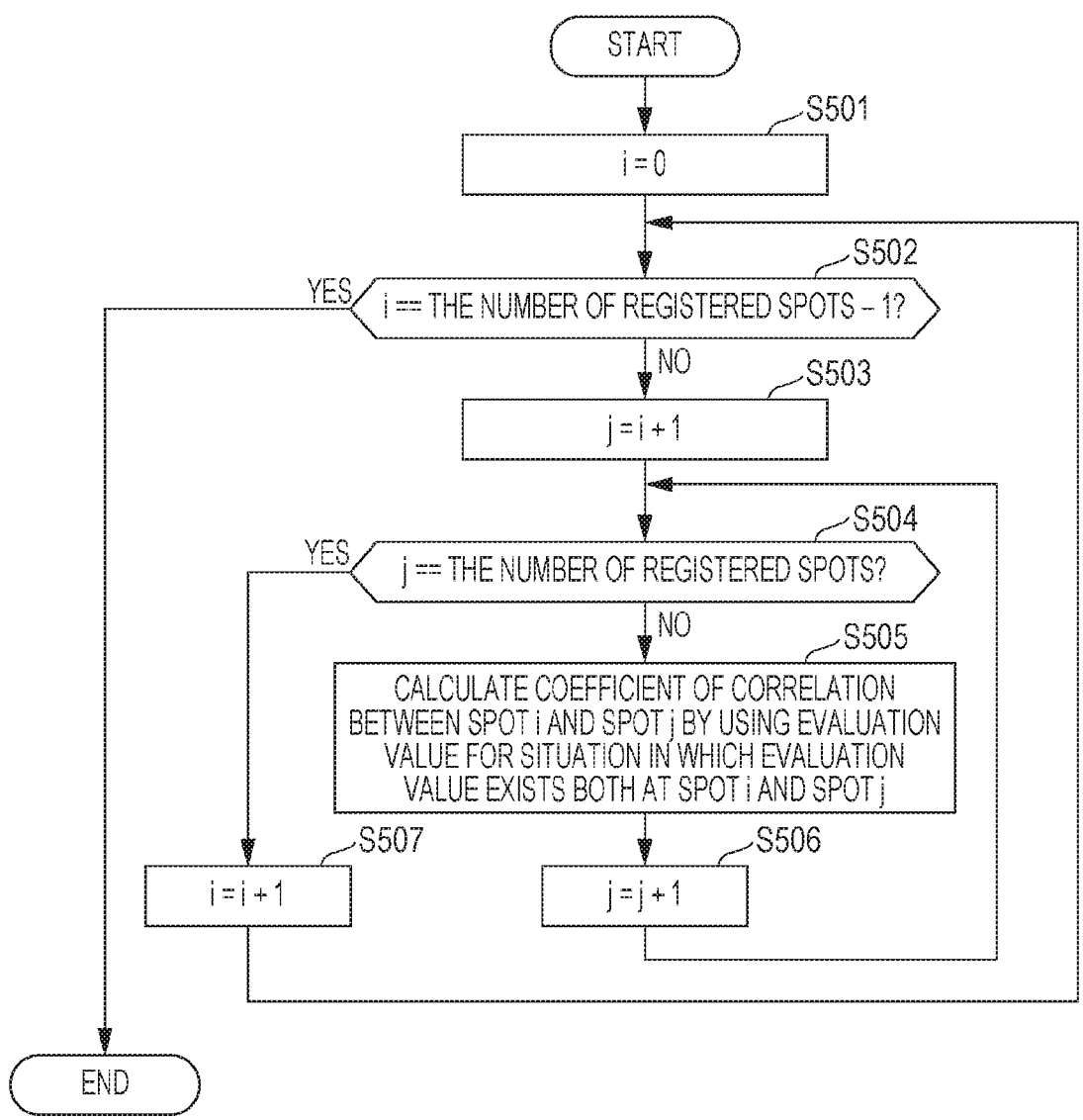
FIG. 5 is a flow chart illustrating an example of a processing procedure for recording an estimated evaluation value in an overall estimation table in the risk information processing system.
Figure 6:
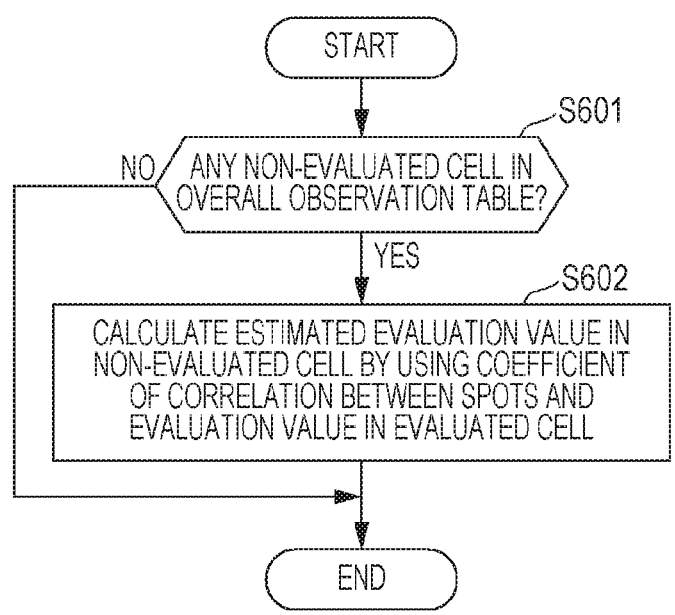
FIG. 6 is a flow chart illustrating an example of a processing procedure for recording an estimated evaluation value in the overall estimation table in the risk information processing system.

FIGS. 4 through 6 are flow charts illustrating an example of a processing procedure for recording an estimated evaluation value in an overall estimation table in the risk information processing system 100 according to the present embodiment.

As illustrated in FIG. 4, the managing unit 202 first calculates coefficients of correlation of degrees of risk between all spots registered in the rows of the overall observation table from cells in which evaluation values have been input in the overall observation table (Step S401).

Next, the managing unit 202 calculates an estimated evaluation value in a non-evaluated cell of the overall observation table from the coefficients of correlation of degrees of risk between all spots registered in the rows of the overall observation table calculated in Step S401 and from the evaluation values in the cells in which the evaluation values have been input in the overall observation table (Step S402), Specifically, the managing unit 202 causes the evaluation values in the evaluated cells among a plurality of cells corresponding to combinations of spots and situations in the overall observation table to be stored in corresponding cells of the overall estimation table as they are. Furthermore, the managing unit 202 causes the estimated evaluation value calculated by using the computing unit 204 in the non-evaluated cell among the plurality of cells of the overall observation table to be stored in a corresponding cell of the overall estimation table. That is, the managing unit 202 estimates first risk information indicative of a degree of risk for a first combination for which an evaluation value has not been input by reading out risk information indicative of degrees of risk that have been input in cells corresponding to respective combinations from the storage unit 205 and then calculating the degree of risk for the first combination by using the risk information thus read out.

FIG. 5 is a flow chart illustrating an example of a processing procedure (corresponding to Step S401 in FIG. 4) for calculating coefficients of correlation between spots from the overall observation table in the risk information processing system 100.

As illustrated in FIG. 5, the managing unit 202 first sets, as a spot i=0, one of spots registered in the rows of the overall observation table (Step S501).

Next, the managing unit 202 determines, for all of the spots registered in the overall observation table, whether or not coefficients of correlation of degrees of risk with the other spots have been calculated (Step S502). Specifically, the managing unit 202 determines whether or not i of a spot for which the coefficients of correlation are currently calculated is equal to the number obtained by subtracting 1 from the number of registered spots. Note that the number of registered spots is the total number of spots registered in the overall observation table. In a case where it is determined that i of the spot for which the coefficients of correlation are currently calculated is equal to the number obtained by subtracting 1 from the number of registered spots, the managing unit 202 determines that coefficients of correlation of degrees of risk with the other spots have been already calculated for all of the spots. Meanwhile, in a case where it is determined that i of the spot for which the coefficients of correlation are currently calculated is not equal to the number obtained by subtracting 1 from the number of registered spots, the managing unit 202 determines that coefficients of correlation of degrees of risk with the other spots have not been calculated for all of the spots.

In a case where it is determined that coefficients of correlation of degrees of risk with the other spots have been already calculated for all of the spots registered in the overall observation table (Yes in Step S502), the managing unit 202 finishes the processing for calculating coefficients of correlation of degrees of risk between spots from the overall observation table.

In a case where it is determined that coefficients of correlation of degrees of risk with the other spots have not been calculated for all of the spots registered in the overall observation table (No in Step S502), the managing unit 202 determines a spot j=i+1 that is different from the spot i=0 and for which coefficients of correlation have not been calculated (Step S503).

Next, the managing unit 202 determines, for the spot i registered in the overall observation table, whether or not coefficients of correlation of degrees of risk with all the other spots j have been calculated (Step S504). Specifically, the managing unit 202 determines whether or not j of another spot is equal to the number of registered spots. In a case where j of the other spot is equal to the number of registered spots, the managing unit 202 determines that coefficients of correlation of degrees of risk with all the other spots j have been calculated for the spot i registered in the overall observation table. Meanwhile, in a case where j of the other spot is not equal to the number of registered spots, the managing unit 202 determines that coefficients of correlation of degrees of risk with all the other spots have not been calculated for the spot i registered in the overall observation table.

In a case where coefficients of correlation of degrees of risk with all the other spots j have not been calculated for the spot i registered in the overall observation table (No in Step S504), the managing unit 202 instructs the computing unit 204 to calculate a coefficient of correlation of degrees of risk between the spot i and the spot j by using evaluation values for a situation in which an evaluation value exists at both the spot i and the spot j. In accordance with the instruction, the computing unit 204 calculates the coefficient of correlation of degrees of risk between the spot i and the spot j (Step S505).

The managing unit 202 increments j (Step S506) and returns to Step S504, and the processing is repeated.

In a case where it is determined that coefficients of correlation of degrees of risk with all the other spots have been calculated for the spot i registered in the overall observation table (Yes in Step S504), the managing unit 202 increments i (Step S507) and returns to Step S502, and the processing is repeated.

The processing procedure for calculating coefficients of correlation of degrees of risk between spots from the overall observation table in the risk information processing system 100 has been described above.

FIG. 6 is a flow chart illustrating an example of a processing procedure (corresponding to Step S402 of FIG. 4) for calculating an estimated evaluation value in a non-evaluated cell at each spot from the overall observation table and the coefficients of correlation in the risk information processing system 100.

As illustrated in FIG. 6, the managing unit 202 first determines whether or not there is a non-evaluated cell in the overall observation table (Step S601). In a case where it is determined that there is no non-evaluated cell in the overall observation table (No in Step S601), the managing unit 202 causes evaluation values in the overall observation table to be stored in corresponding cells of the overall estimation table as they are, and then the processing is finished.

In a case where it is determined that there is a non-evaluated cell in the overall observation table (Yes in Step S601), the managing unit 202 instructs the computing unit 204 to calculate an estimated evaluation value in the non-evaluated cell. In accordance with the instruction from the managing unit 202, the computing unit 204 calculates, for each column of situation registered in the overall observation table, an estimated evaluation value in a non-evaluated cell by using coefficients of correlation of degrees of risk between spots and evaluated evaluation values in the column (Step S602). The managing unit 202 causes the evaluation values in the overall observation table to be stored in corresponding cells of the overall estimation table as they are and causes the estimated evaluation value calculated by the computing unit 204 to be stored in a corresponding cell of the overall estimation table.

The processing procedure for calculating an estimated evaluation value for a non-evaluated cell at each spot from the overall observation table and the coefficients of correlation in the risk information processing system 100 has been described above.

Next, an example of calculation formulas used to calculate a coefficient of correlation of degrees of risk between the spot i and the spot j by using evaluation values for a situation in which an evaluation value exists at both the spot i and the spot j in Step S505 is described.

A formula of a relative degree of risk at a spot x in a situation y is expressed by the following formula 1:

$$r_{xy} - \bar{r}_x \qquad \text{formula 1}$$

where $r_{xy}$ is an evaluation value (occurrence or non-occurrence of a risk event) at the spot x in the situation y and $\bar{r}_x$ is an average of evaluation values (occurrence or non-occurrence of a risk event) at the spot x.

A formula of a degree of similarity between an evaluation value (occurrence or non-occurrence of a risk event) at a spot i in a situation k and an evaluation value (occurrence or non-occurrence of a risk event) at a spot j in the situation k is expressed by the following formula 2. It can be said that in a case where the value of this formula is negative, there is no similarity, whereas in a case where the value of this formula is positive, there is a similarity.

$$(r_{ik} - \bar{r}_i)(r_{jk} - \bar{r}_j) \qquad \text{formula 2}$$

A formula of a coefficient of correlation of degrees of risk between a spot a and the spot x is expressed by the following formula 3. In this case, computation is performed only for a situation in which an evaluation value exists at both the spot a and the spot x.

$$\rho_{ax} = \frac{\sum_y (r_{ay} - \bar{r}_a')(r_{xy} - \bar{r}_x')}{\sqrt{\sum_y (r_{ay} - \bar{r}_a')^2} \sqrt{\sum_y (r_{xy} - \bar{r}_x')^2}} \qquad \text{formula 3}$$

where $\bar{r}_x'$ is an average of evaluation values (occurrence or non-occurrence of a risk event) at the spot x in situations in which a common risk event occurred both at the spot a and the spot x.

Next, an example of calculation formulas used to calculate, for each sensor data, a non-evaluated evaluation value from coefficients of correlation of degrees of risk between spots and evaluated evaluation values in Step S602 is described.

A formula for calculating a degree of risk of a combination of the spot a and the situation y from evaluation values (occurrence or non-occurrence of a risk event) at all spots x other than the spot a is expressed by the following formula 4:

$$\Sigma_x \rho_{ax}(r_{xy} - \bar{r}_x') \qquad \text{formula 4}$$

The following formula 5 is obtained by performing normalization with respect to the formula 4 to correct a problem that a situation for which an evaluation value (occurrence or non-occurrence of a risk event) has been set at more spots is more easily evaluated.

$$\frac{\sum_x \rho_{ax}(r_{xy} - \bar{r}_x')}{\sum_x |\rho_{ax}|} \qquad \text{formula 5}$$

A formula of an estimated evaluation value at the spot a in the situation y is expressed by the following formula 6:

$$\overline{r_{ay}} = \overline{r_a} + \frac{\sum_{x} \rho_{ax}(r_{xy} - \overline{r_x})}{\sum_{x} |\rho_{ax}|}$$ formula 6

Next, the processing of the risk information processing system 100 is described by using specific examples of the overall observation table and the overall estimation table.

FIG. 7 is a diagram for explaining a configuration of the overall observation table stored in the storage unit 205 according to Embodiment 1 of the present disclosure.

In the overall observation table 701, "2" indicative of non-evaluation is held in each cell as an initial value. For example, in a case where an accident occurs when sensor data indicative of a situation a is acquired at a spot A, the managing unit 202 causes "3" indicative of occurrence of a risk event to be recorded as an evaluation value in a cell of the spot A and the situation a in the overall observation table 701. For example, in a case where an accident does not occur when sensor data indicative of a situation m is acquired at a spot N, the managing unit 202 causes "1" indicative of non-occurrence of a risk event to be recorded as an evaluation value in a cell of the spot N and the situation m in the overall observation table 701. In the example of the overall observation table 701 illustrated in FIG. 7, only a cell of a spot B and a situation b is a non-evaluated cell, and the other cells have been evaluated. Note that sensor data indicative of a situation is sensor data that satisfies a predetermined condition for determining whether or not this situation has occurred.

FIG. 8 is a diagram for explaining a configuration of the overall estimation table stored in the storage unit 205 according to Embodiment 1.

The values of evaluated cells in an overall estimation table 801 are the same as those in the overall observation table 701 illustrated in FIG. 7, A difference between the overall estimation table 801 and the overall observation table 701 is that an estimated evaluation value "2.75" is input in the cell of the spot B and the situation b which is a non-evaluated cell in the overall observation table 701. The estimated evaluation value is calculated by using coefficients of correlation of degrees of risk between the spot B and other spots, evaluation values in the cells of the situation b at respective spots, and the formula 6.

That is, the managing unit 202 estimates first risk information which is an evaluation value in a non-evaluated first cell (first combination) by using evaluation values (risk information) in three evaluated cells, i.e., second risk information which is a degree of risk (evaluation value) in a second cell (second combination) whose spot is the same as the first cell and whose situation is different from the first cell, third risk information which is a degree of risk (evaluation value) in a third cell (third combination) whose situation is the same as the first cell and whose spot is different from the first cell, and fourth risk information which is a degree of risk (evaluation value) in a fourth cell (fourth combination) whose situation is the same as the second cell and whose spot is the same as the third cell. Specifically, the managing unit 202 first calculates correlation of degrees of risk between spots by using the evaluation value in the second cell and the evaluation value in the fourth cell and then calculates the degree of risk in the first cell from the evaluation value in the third cell by using the calculated correlation of degrees of risk between the spots.

FIG. 9 is a diagram illustrating an example of the overall observation table stored in the storage unit 205 according to Embodiment 1 like the one illustrated in FIG. 7.

A difference between FIG. 9 and FIG. 7 is that more details of the situations are disclosed in the overall observation table. As in the case of FIG. 7, "2" indicative of non-evaluation is held in each cell as an initial value in the overall observation table 901. For example, in a case where an accident occurs when sensor data indicative of the presence of a vehicle ahead within a certain distance is acquired at the spot B, the managing unit 202 causes "3" indicative of occurrence of a risk event to be recorded as an evaluation value in a cell of the spot A and PRESENCE OF VEHICLE AHEAD WITHIN CERTAIN DISTANCE in the overall observation table 901. For example, in a case where an accident does not occur when sensor data indicative of the presence of road surface freezing is acquired at the spot N, the managing unit 202 causes "1" indicative of non-occurrence of a risk event to be recorded as an evaluation value in a cell of the spot N and PRESENCE OF ROAD SURFACE FREEZING in the overall observation table 901. In the example of the overall observation table 901 illustrated in FIG. 9, a cell of the spot B and PRESENCE OF VEHICLE BEHIND WITHIN CERTAIN DISTANCE, a cell of the spot B and THE NUMBER OF PEDESTRIAN WITHIN CERTAIN DISTANCE>THRESHOLD VALUE a, and a cell of the spot O and PRESENCE OF OPPOSING VEHICLE WITHIN CERTAIN DISTANCE are non-evaluated cells, and the other cells are evaluated cells.

FIG. 10 is a diagram illustrating an example of the overall estimation table stored in the storage unit 205 according to Embodiment 1 like the one illustrated in FIG. 8.

A difference between FIG. 10 and FIG. 8 is that more details of the situations are disclosed in the overall observation table. As in the case of FIG. 8, estimated evaluation values "2.98", "1.05", and "1.12" are input in the cell of the spot B and PRESENCE OF VEHICLE BEHIND WITHIN CERTAIN DISTANCE, the cell of the spot B and THE NUMBER OF PEDESTRIANS WITHIN CERTAIN DISTANCE>THRESHOLD VALUE a, and the cell of the spot O and PRESENCE OF OPPOSING VEHICLE WITHIN CERTAIN DISTANCE, each of which is a non-evaluated cell in the overall observation table 901 of FIG. 9. The estimated evaluation value "2.98" is a value calculated by using coefficients of correlation of degrees of risk between the spot B and the other spots, evaluation values in cells of a column of PRESENCE OF VEHICLE BEHIND WITHIN CERTAIN DISTANCE at the respective spots, and the formula 6. The estimated evaluation value "1.05" is a value calculated by using coefficients of correlation of degrees of risk between the spot B and the other spots, evaluation values in cells of a column of THE NUMBER OF PEDESTRIANS WITHIN CERTAIN DISTANCE> THRESHOLD VALUE a at respective spots, and the formula 6. The estimated evaluation value "1.12" is a value calculated by using coefficients of correlation of degrees of risk between the spot O and the other spots, evaluation values in cells of a column of PRESENCE OF OPPOSING VEHICLE WITHIN CERTAIN DISTANCE at respective spots, and the formula 6.

The processing of the risk information processing system 100 according to the present embodiment has been described above.

Effects

The risk information processing system 100 according to the present embodiment can obtain, from combinations of spots and situations (i.e., evaluated cells) for which an evaluation value has been acquired, a degree of risk (an evaluation value indicative of occurrence or non-occurrence of a risk event) at a spot (i.e., a non-evaluated cell) at which sensor data indicative of a situation has not been acquired. This allows the risk information processing system 100 to acquire degrees of risk (evaluation values indicative of occurrence or non-occurrence of a risk event) for all of the managed combinations of spots and situations without actually acquiring all sensing data.

Embodiment 2

FIG. 11 is a block diagram illustrating an example of a configuration of a risk information processing system 110 that achieves a risk information processing method according to Embodiment 2.

In the risk information processing system 110 illustrated in FIG. 11, moving objects 112 and 113 and observation devices 114 and 115, each of which acquires and transmits positional information and sensor data, and a server device 111 having a function of a risk information processing device are connected over a network. The following describes only differences of functions of constituent elements from those in Embodiment 1. Description of constituent elements whose functions are not different from those in Embodiment 1 is omitted.

Each of the moving object 112 and the moving object 113 includes a data acquiring unit 211. Each of the observation device 114 and the observation device 115 includes a data acquiring unit 211. The following discusses the moving object 112, but the moving object 112 may be replaced with the moving object 113, the observation device 114, or the observation device 115 in the following description.

The data acquiring unit 211 has a function of acquiring sensor data that specifies a driver in addition to the functions of the data acquiring unit 201 of Embodiment 1. The data acquiring unit 211 may specify a driver by matching between driver information that is registered in advance and a smartphone, a key of the vehicle, a driving license, or the like of the driver. The data acquiring unit 211 may specify a driver on the basis of a physical characteristic of the driver such as a fingerprint, a palm print, a pupil of an eye, or a voiceprint. The kind of sensor data is not limited to a specific one.

The server device 111 includes a control unit 210, an input unit 203, a storage unit 215, and a receiving unit 206. The server device 111 has a function as a risk information processing device.

The control unit 210 includes a managing unit 212 and a computing unit 214.

The managing unit 212 generates an overall observation table and individual observation tables, in each of which evaluation values indicative of occurrence or non-occurrence of a risk event are associated with combination of spots and situations, and stores the overall observation table and the individual observation tables in the storage unit 215. The overall observation table is, for example, the same as the overall observation table described in Embodiment 1. It can also be said that the overall observation table is overall risk information for all drivers. The individual observation tables have the same rows and columns as the overall observation table and are separately managed as individual tables for the respective drivers. That is, each of the individual observation tables is made up of individual risk information for a driver which is degrees of risk that are input for the driver in combinations of spots of occurrence of a risk event and situations of occurrence of the risk event at the spots.

The managing unit 212 specifies a driver by using positional information and sensor data including sensor data that specifies the driver that are acquired from the receiving unit 206 and then selects an individual observation table associated with the specified driver. The managing unit 212 causes a degree of risk (an evaluation value indicative of occurrence or non-occurrence of a risk event) for a combination of a spot indicated by the positional information and a situation indicated by the sensor data to be recorded in a corresponding cell of the overall observation table and in a corresponding cell of the individual observation table stored in the storage unit 215 by using the positional information and the sensor data acquired from the receiving unit 206 or occurrence or non-occurrence of a risk event acquired from the input unit 203. Occurrence or non-occurrence of a risk event is, for example, occurrence or non-occurrence of an accident. Occurrence or non-occurrence of a risk event may be, for example, occurrence or non-occurrence of a near miss.

Processing for generating an overall estimation table by using the overall observation table in the managing unit 212 is the same as that in the managing unit 202 of Embodiment 1, and therefore description thereof is omitted. The managing unit 212 stores the generated overall estimation table in the storage unit 215.

The managing unit 212 calculates a coefficient of correlation of degrees of risk between the overall estimation table and the individual observation table. Then, the managing unit 212 calculates an estimated evaluation value in a non-evaluated cell of the individual observation table from estimated evaluation values of the overall estimation table by using the calculated coefficient of correlation. The managing unit 212 thus generates an individual estimation table and then stores the individual estimation table in the storage unit 215.

The computing unit 214 has a function of calculating a coefficient of correlation of degrees of risk between the overall estimation table and the individual observation table and a function of calculating estimated evaluation values in non-evaluated cells of the individual observation table from estimated evaluation values of the overall estimation table in addition to the functions of the computing unit 204 of Embodiment 1.

The storage unit 215 holds, for respective drivers, one or more individual observation tables that have the same rows and columns as the overall observation table and one or more individual estimation tables that have the same rows and columns as the overall observation table in addition to the overall observation table and the overall estimation table that are held in the storage unit 205 of Embodiment 1.

The configuration of the risk information processing system 110 according to the present embodiment has been described above.

Next, operation of the risk information processing system 110 according to the present embodiment is described.

Figure 12:
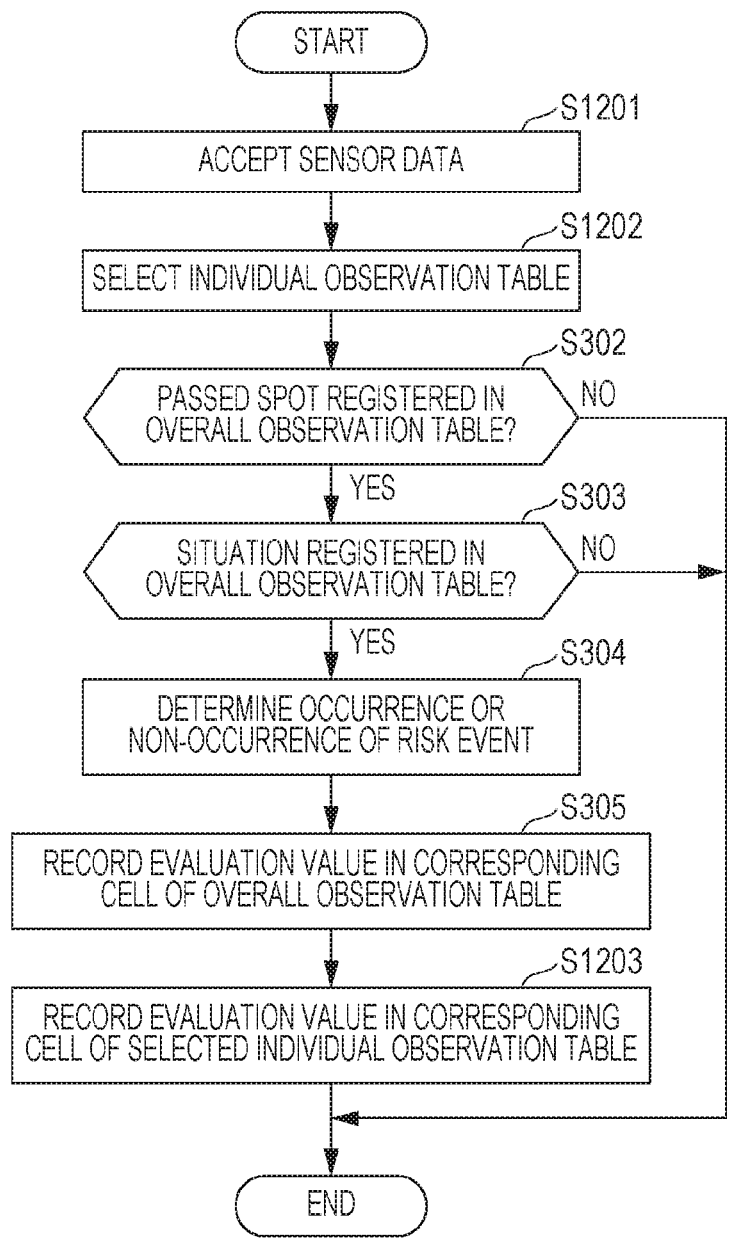
FIG. 12 is a flow chart illustrating an example of a processing procedure for recording an evaluation value in an overall observation table and an individual observation table in the risk information processing system according to Embodiment 2.

FIG. 12 is a flow chart illustrating an example of a processing procedure for recording an evaluation value in the overall observation table and the individual observation table in the risk information processing system 110 according to Embodiment 2.

As illustrated in FIG. 12, the receiving unit 206 receives positional information and sensor data from the moving objects 112 and 113 and the observation devices 114 and 115 and then transmits the received positional information and sensor data to the control unit 210. The control unit 210 accepts input of the positional information and the sensor data (Step S1201). The sensor data accepted by the control unit 210 includes sensor data that specifies a driver unlike the one in Embodiment 1.

Next, the managing unit 212 of the control unit 210 specifies a driver on the basis of the received sensor data and then selects an individual observation table associated with the specified driver (Step S1202).

Next, the managing unit 212 performs the same processing as that in Step S302 to Step S305 of FIG. 3 of Embodiment 1 by using the received positional information and sensor data.

After Step S305, the managing unit 212 records an evaluation value determined in Step S305 in a corresponding cell of the individual observation table selected in Step S1202 (Step S1203), and then the processing is finished.

The processing procedure for recording an evaluation value in the overall observation table and the individual observation table in the risk information processing system 100 has been described above. That is, the risk information processing system 100 stores, in the storage unit 215, degrees of risk that have been input for each driver in combinations of spots of occurrence of a risk event situations of occurrence of the risk event at the spots as individual risk information for the driver and as overall risk information for all drivers.

Figure 13:
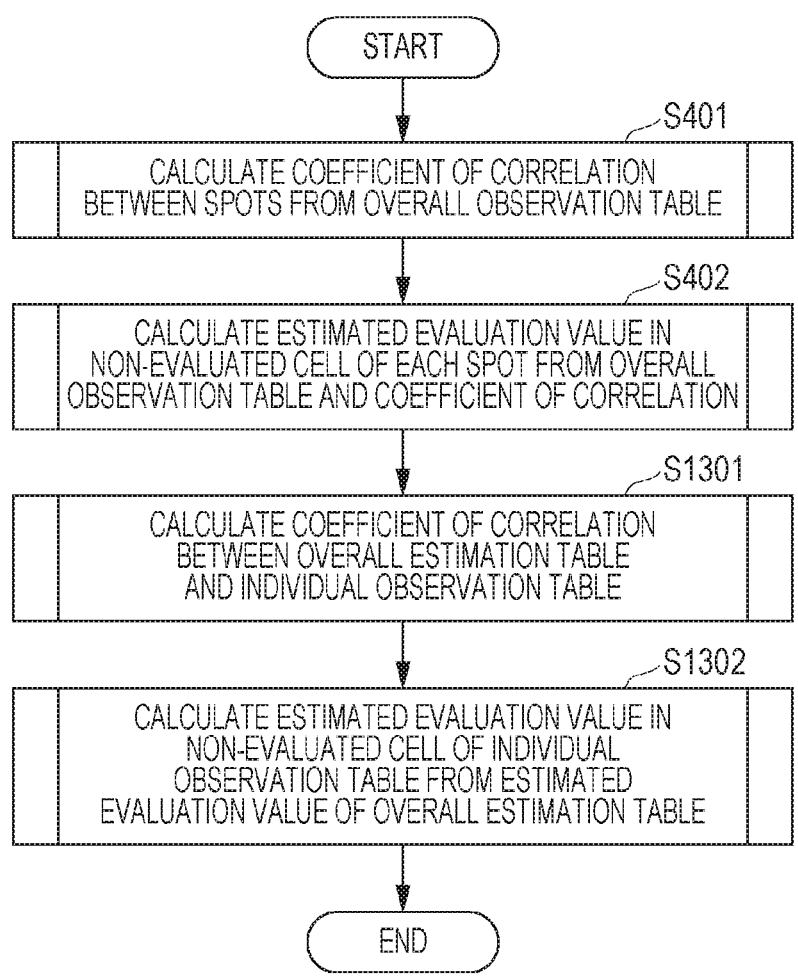
FIG. 13 is a flow chart illustrating an example of a processing procedure for recording an estimated evaluation value in the overall estimation table and the individual estimation table in the risk information processing system according to Embodiment 2.
Figure 14:
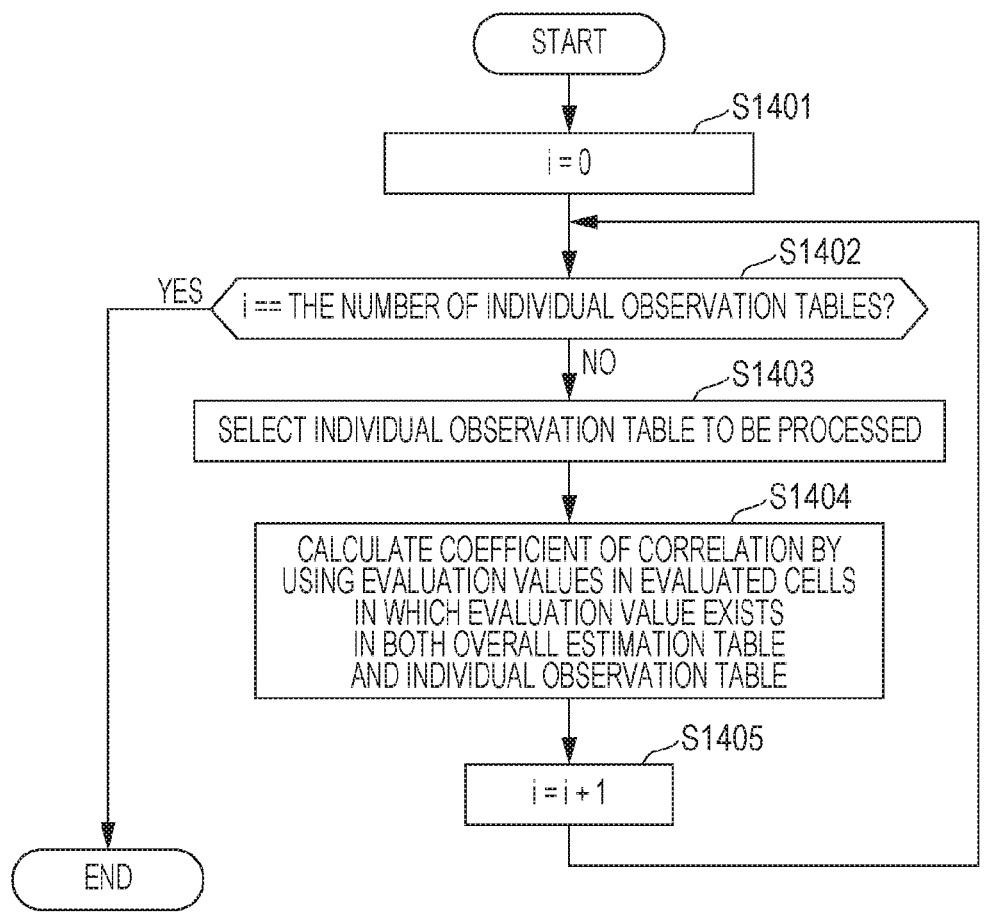
FIG. 14 is a flow chart illustrating an example of a processing procedure for recording an estimated evaluation value in the overall estimation table and the individual estimation table in the risk information processing system according to Embodiment 2.
Figure 15:
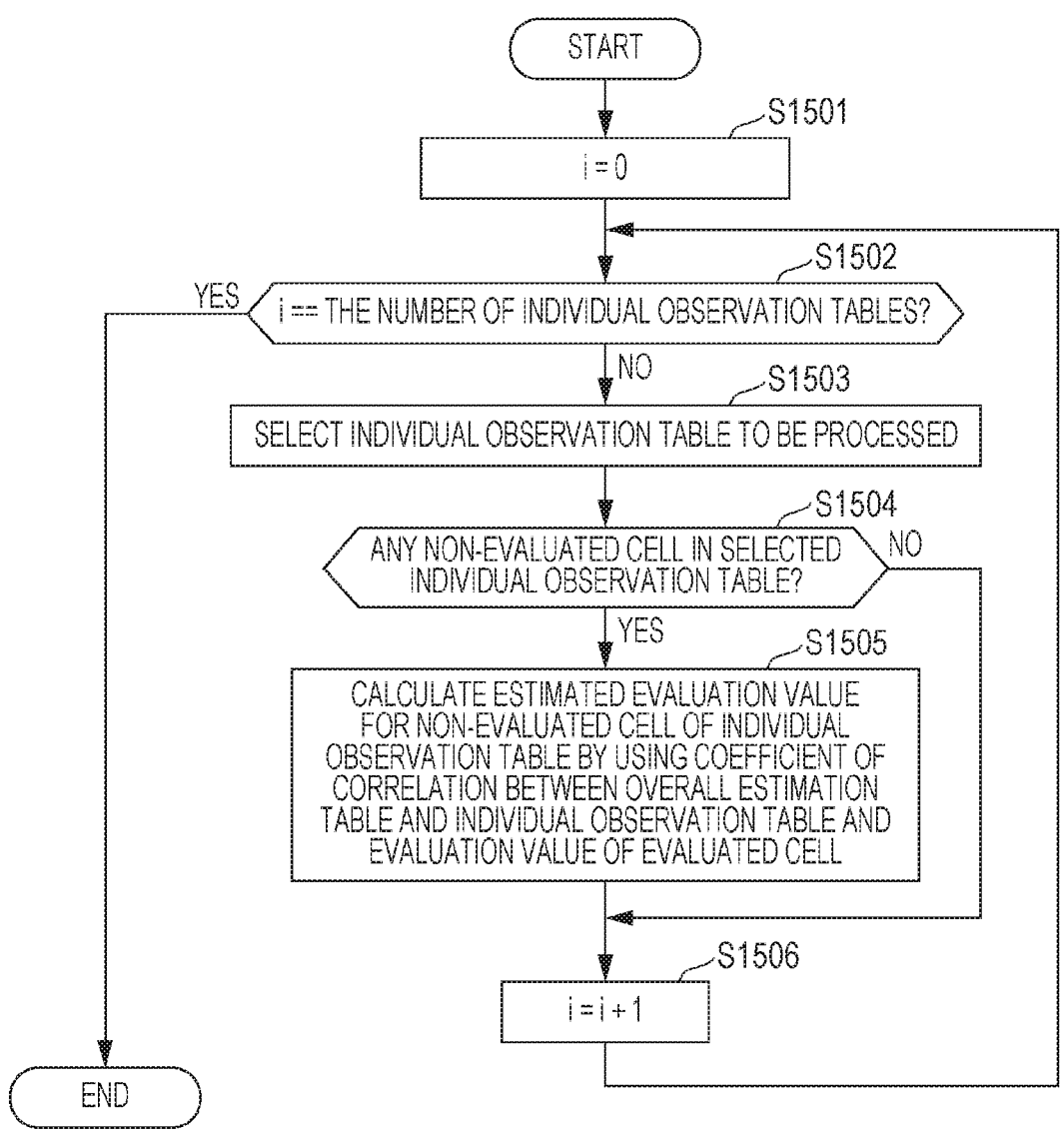
FIG. 15 is a flow chart illustrating an example of a processing procedure for recording an estimated evaluation value in the overall estimation table and the individual estimation table in the risk information processing system according to Embodiment 2.

FIGS. 13 through 15 are flow charts for illustrating an example of a processing procedure for recording an estimated evaluation value in the overall estimation table and the individual estimation table in the risk information processing system 110 according to Embodiment 2.

As illustrated in FIG. 13, the managing unit 212 first performs the same processing as that in Step S401 and Step S402 of FIG. 4 of Embodiment 1.

Next, the managing unit 212 calculates a coefficient of correlation of degrees of risk between the overall estimation table and the individual observation table (Step S1301).

The managing unit 212 calculates an estimated evaluation value in a non-evaluated cell of the individual observation table from estimated evaluation values of the overall estimation table (Step S1302). The managing unit 212 causes evaluation values in evaluated cells among a plurality of cells of the individual observation table to be stored in corresponding cells of the individual estimation table as they are. Furthermore, the managing unit 212 causes an estimated evaluation value calculated by using the computing unit 214 in a non-evaluated cell among the plurality of cells of the individual observation table to be stored in a corresponding cell of the individual estimation table.

FIG. 14 is a flow chart illustrating an example of a processing procedure (corresponding to Step S1301 of FIG. 13) for calculating coefficients of correlation of degrees of risk between the overall estimation table and the individual observation tables in the risk information processing system 110.

As illustrated in FIG. 14, the managing unit 212 first sets one of the individual observation tables as i=0 (Step S1401).

Next, the managing unit 212 determines, for all of the individual observation tables, whether or not a coefficient of correlation of degrees of risk with the overall estimation table has been calculated (Step S1402), Specifically, the managing unit 212 determines whether or not i of an individual observation table for which a coefficient of correlation is currently calculated is equal to the number of individual observation tables. Note that the number of individual observation tables is the total number of individual observation tables held in the storage unit 215. In a case where it is determined that i of the individual observation table for which a coefficient of correlation is currently calculated is equal to the number of individual observation tables, the managing unit 212 determines that a coefficient of correlation of degrees of risk with the overall estimation table has been calculated for all of the individual observation tables. Meanwhile, in a case where it is determined that i of the individual observation table for which a coefficient of correlation is currently calculated is not equal to the number of individual observation tables, the managing unit 212 determines that a coefficient of correlation of degrees of risk with the overall estimation table has not been calculated for all of the individual observation tables.

In a case where a coefficient of correlation of degrees of risk with the overall estimation table has been calculated for all of the individual observation tables (Yes in Step S1402), the managing unit 212 finishes the processing for calculating coefficients of correlation of degrees of risk between the overall estimation table and the individual observation tables.

In a case where a coefficient of correlation of degrees of risk with the overall estimation table has not been calculated for all of the individual observation tables (No in Step S1402), the managing unit 212 selects, as an individual observation table to be processed, an individual observation table for which a coefficient of correlation has not been calculated (Step S1403).

The managing unit 212 instructs the computing unit 214 to calculate a coefficient of correlation of degrees of risk between the individual observation table selected in Step S1403 and the overall estimation table. In accordance with the instruction from the managing unit 212, the computing unit 214 calculates the coefficient of correlation by using evaluation values in evaluated cells in which an evaluation value exists in both the overall estimation table and the individual observation table (Step S1404).

The managing unit 212 increments i in order to calculate a coefficient of correlation of degrees of risk between the overall estimation table and an individual observation table for which a coefficient of correlation has not been calculated (Step S1405) and returns to Step S1402, and the processing is repeated.

The processing procedure for calculating coefficients of correlation of degrees of risk between the overall estimation table and the individual observation tables in the risk information processing system 110 has been described above. That is, the risk information processing system 110 calculates correlation of degrees of risk between individual observation tables, which are individual risk information, and the overall estimation table, which is overall risk information.

FIG. 15 is a flow chart illustrating an example of a processing procedure (corresponding to Step S1302 in FIG. 13) for calculating an estimated evaluation value in a non-evaluated cell of an individual observation table from evaluation values (including estimated evaluation values) of the overall estimation table in the risk information processing system 110.

As illustrated in FIG. 15, the managing unit 212 first sets one of the individual observation tables as i=0 (Step S1501).

Next, the managing unit 212 determines, for all of the individual observation tables stored in the storage unit 215, whether or not an estimated evaluation value has been calculated (Step S1502). Specifically, the managing unit 212 determines whether or not i of an individual observation table for which an estimated evaluation value is currently calculated is equal to the number of individual observation tables. Note that the number of individual observation tables is the total number of individual observation tables stored in the storage unit 215. In a case where i of the individual observation table for which an estimated evaluation value is currently calculated is equal to the number of individual observation tables, the managing unit 212 determines that an estimated evaluation value has been calculated for all of the individual observation tables. Meanwhile, in a case where i of the individual observation table for which an estimated evaluation value is currently calculated is not equal to the number of individual observation tables, the managing unit 212 determines that an estimated evaluation value has not been calculated for all of the individual observation tables.

In a case where it is determined that an estimated evaluation value has been calculated for all of the individual observation tables (Yes in Step S1502), the processing is finished.

In a case where it is determined that an estimated evaluation value has not been calculated for all of the individual observation tables (No in Step S1502), the managing unit 212 selects, as an individual observation table to be processed, an individual observation table for which an estimated evaluation value has not been calculated (Step S1503).

The managing unit 212 determines whether or not there is a non-evaluated cell in the individual observation table selected in Step S1503 (Step S1504). In a case where the managing unit 212 determines that there is no non-evaluated cell in the individual observation table (No in Step S1504), the processing proceeds to Step S1506.

In a case where it is determined that there is a non-evaluated cell in the individual observation table (Yes in Step S1504), the managing unit 212 instructs the computing unit 214 to calculate an estimated evaluation value in the non-evaluated cell. In accordance with the instruction from the managing unit 212, the computing unit 214 calculate the estimated evaluation value in the non-evaluated cell of the individual observation table by using a coefficient of correlation of degrees of risk between the overall estimation table and the individual observation table and the evaluation values (including estimated evaluation values) in the evaluated cells of the overall estimation table (Step S1505).

The managing unit 212 increments i (Step S1506) and returns to Step S1502, and then the processing is repeated.

The processing procedure for calculating an estimated evaluation value in a non-evaluated cell of an individual observation table for a driver from evaluation values (including estimated evaluation values) of the overall estimation table in the risk information processing system 110 has been described above. That is, the risk information processing system 110 calculates an estimated evaluation value of an individual observation table from evaluation values of the overall estimation table by using calculated correlation of degrees of risk between the individual observation table, which is individual risk information, and the overall estimation table, which is overall risk information.

Next, the processing in the risk information processing system is described by using specific examples of the overall estimation table, the individual observation table, and the individual estimation table.

FIG. 16 is a diagram illustrating an example of the overall estimation table stored in the storage unit 215 according to Embodiment 2. An evaluation value or an estimated evaluation value is recorded in all cells of an overall estimation table 1601. That is, the overall estimation table 1601 is a table generated when Step S402 is finished.

FIG. 17 is a diagram illustrating an example of an individual observation table stored in the storage unit 215 according to Embodiment 2. In this example, an evaluation value is recorded only in a cell of a spot A and PRESENCE OF VEHICLE AHEAD WITHIN CERTAIN DISTANCE in an individual observation table 1701. The other cells are not evaluated. A coefficient of correlation between the evaluated cell of the individual observation table 1701 and the evaluated cell of the overall estimation table 1601 is calculated to be "1" by using the formula 6.

FIG. 18 is a diagram illustrating an example of an individual estimation table stored in the storage unit 215 according to Embodiment 2. In this example, since the coefficient of correlation of degrees of risk between the overall estimation table 1601 and the individual observation table 1701 is "1" the same evaluation values as the overall estimation table 1601 are input in the non-evaluated cells of the individual observation table 1701.

The operation of the risk information processing system 110 according to the present embodiment has been described above.

Effects

The risk information processing system 110 according to the present embodiment can obtain, from combinations of spots and situations (i.e., evaluated cells) for which an evaluation value has been acquired, a degrees of risk (an evaluation value indicative of occurrence or non-occurrence of a risk event) at a spot (i.e., a non-evaluated cell) for which sensor data has not been acquired. Furthermore, the risk information processing system 110 can specify a driver and obtain degrees of risk for the specified drive by using degrees of risk for combinations of spots and situations that are targeted at all drivers. This allows the risk information processing system 110 to acquire degrees of risk for each driver (evaluation values indicative of occurrence or non-occurrence of a risk event) without actually acquiring, for each driver, all sensing data for all of managed combinations of spots and situations.

Embodiment 3

Figure 19:
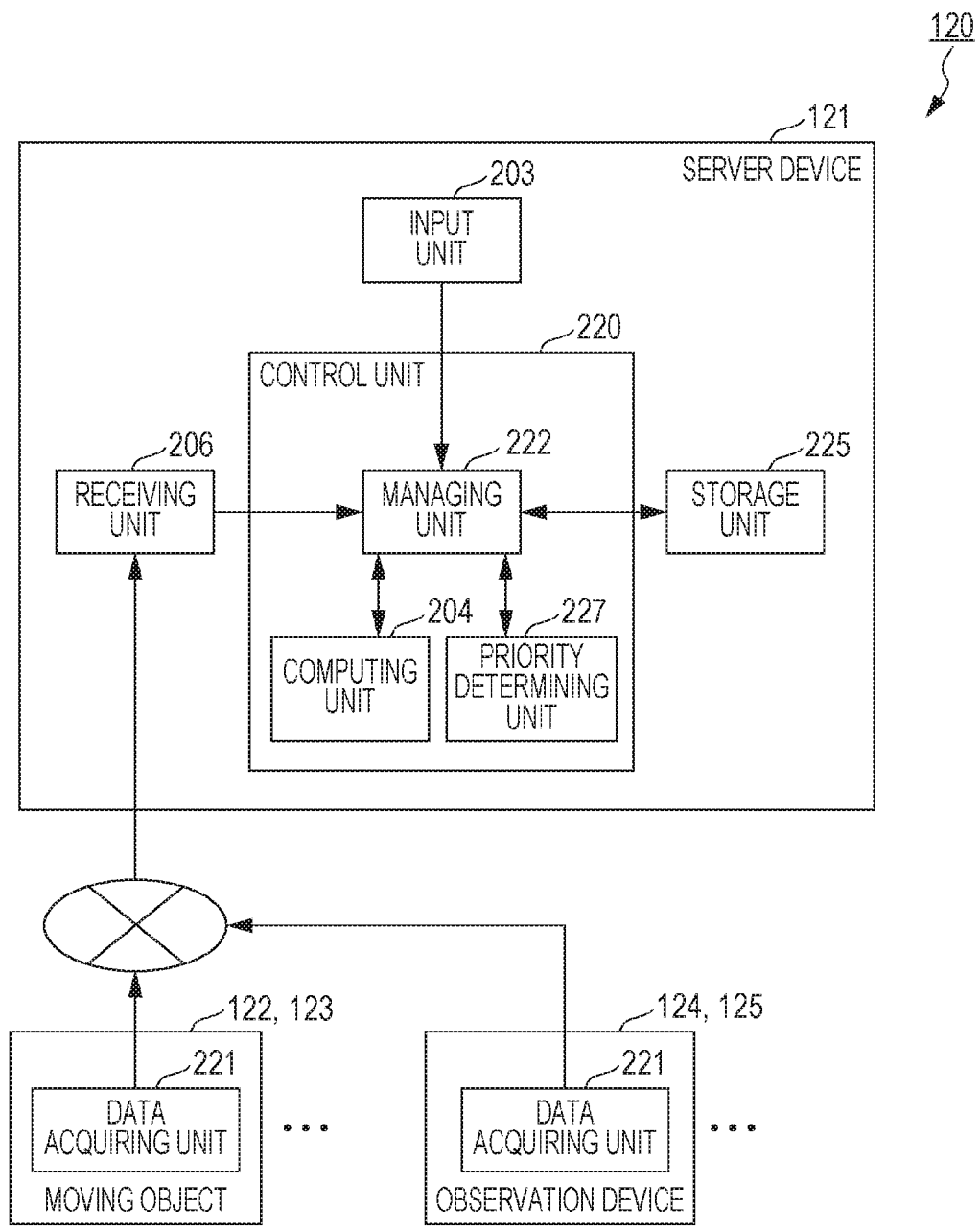
FIG. 19 is a block diagram illustrating an example of a configuration of a risk information processing system that achieves a risk information processing method according to Embodiment 3.

FIG. 19 is a block diagram illustrating an example of a configuration of a risk information processing system 120 that achieves a risk information processing method according to Embodiment 3.

In the risk information processing system 110 illustrated in FIG. 19, moving objects 122 and 123 and observation devices 124 and 125, each of which acquires and transmits positional information and sensor data, and a server device 121 having a function of a risk information processing device are connected over a network. The following describes only differences of functions of constituent elements from those in Embodiment 1. Description of constituent elements whose functions are not different from those in Embodiment 1 is omitted.

Each of the moving object 122 and the moving object 123 includes a data acquiring unit 221. Each of the observation device 124 and the observation device 125 includes a data acquiring unit 221. The following discusses the moving object 122, but the moving object 122 may be replaced with the moving object 123, the observation device 124, or the observation device 125 in the following description.

The data acquiring unit 221 has a function of acquiring sensor data used for determination of priority such as the amount of traffic at each spot in addition to the functions of the data acquiring unit 201 of Embodiment 1.

The server device 121 includes a control unit 220, an input unit 203, a storage unit 225, and a receiving unit 206. The server device 121 has a function as a risk information processing device.

The control unit 220 includes a managing unit 222, a computing unit 204, and a priority determining unit 227.

The managing unit 222 generates an overall observation table in which evaluation values indicative of occurrence or non-occurrence of a risk event are associated with combination of spots and sensor data and then stores the overall observation table in the storage unit 225. The overall observation table is the same as the overall observation table described in Embodiment 1.

The managing unit 222 causes evaluation values (evaluation values (degrees of risk) indicative of occurrence or non-occurrence of a risk event) for combinations of spots indicated by positional information and situations indicated by sensor data to be recorded in corresponding cells indicative of combinations in the overall observation table stored in the storage unit 225 by using the positional information and the sensor data acquired from the receiving unit 206 or occurrence or non-occurrence of a risk event acquired from the input unit 203. Occurrence or non-occurrence of a risk event is, for example, occurrence or non-occurrence of an accident. Occurrence or non-occurrence of a risk event may be, for example, occurrence or non-occurrence of a near miss.

Furthermore, the managing unit 222 acquires the positional information and the sensor data from the receiving unit 206, extracts information used for determination of priority (e.g., the amount of traffic at each spot) that is included in the sensor data, and then records the information in an event frequency table stored in the storage unit 225.

Processing for generating an overall estimation table by using the overall observation table in the managing unit 222 is almost the same as that in the managing unit 202 of Embodiment 1. The processing for generating the overall estimation table in the managing unit 222 is different from that in the managing unit 202 of Embodiment 1 in that the managing unit 222 instructs the computing unit 204 to calculate estimated evaluation values in the order determined by the priority determining unit 227.

The priority determining unit 227 determines the order of calculation of the estimated evaluation values by referring to the event frequency table stored in the storage unit 225. In the processing for generating the overall estimation table from the overall observation table, the priority determining unit 227 arranges coefficients of correlation of degrees of risk between spots and estimated evaluation values in the determined order (e.g., order of descending amount of traffic at spots).

The storage unit 225 stores therein the information used for determination of priority (e.g., frequency information in which the frequencies of a traffic event such as the amounts of traffic at respective spots are associated with the respective spots) as an event frequency table in addition to the overall observation table and the overall estimation table stored in the storage unit 205 of Embodiment 1.

The configuration of the risk information processing system 120 according to the present embodiment has been described above.

Next, operation of the risk information processing system 120 according to the present embodiment is described.

Figure 20:
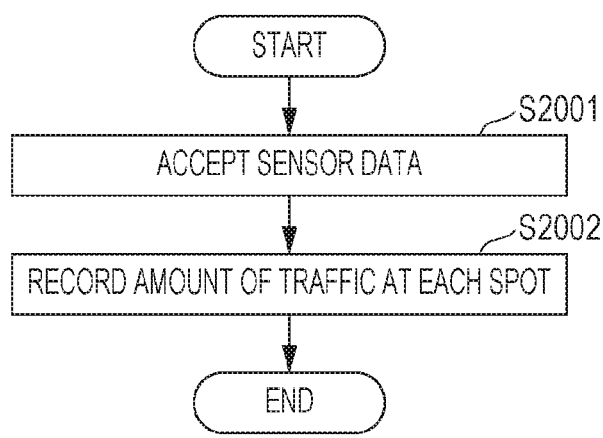
FIG. 20 is a flow chart illustrating an example of a processing procedure for recording information in an event frequency table in the risk information processing system according to Embodiment 3.

FIG. 20 is a flow chart illustrating an example of a processing procedure for recording information in the event frequency table in the risk information processing system 120 according to Embodiment 3.

As illustrated in FIG. 20, the receiving unit 206 receives positional information and sensor data from the moving objects 122 and 123 and the observation devices 124 and 125 and then transmits the received positional information and sensor data to the control unit 220. The control unit 220 accepts input of the positional information and the sensor data (Step S2001). The sensor data accepted by the control unit 220 includes sensor data used for determination of priority such as the amounts of traffic at respective spots unlike the one described in Embodiment 1.

Next, the managing unit 222 of the control unit 220 extracts the amounts of traffic at respective spots from the received sensor data and then records the extracted amounts of traffic at respective spots in the event frequency table stored in the storage unit 225 (Step S2002).

The processing procedure for recording information in the event frequency table in the risk information processing system 120 has been described above.

Figure 21:
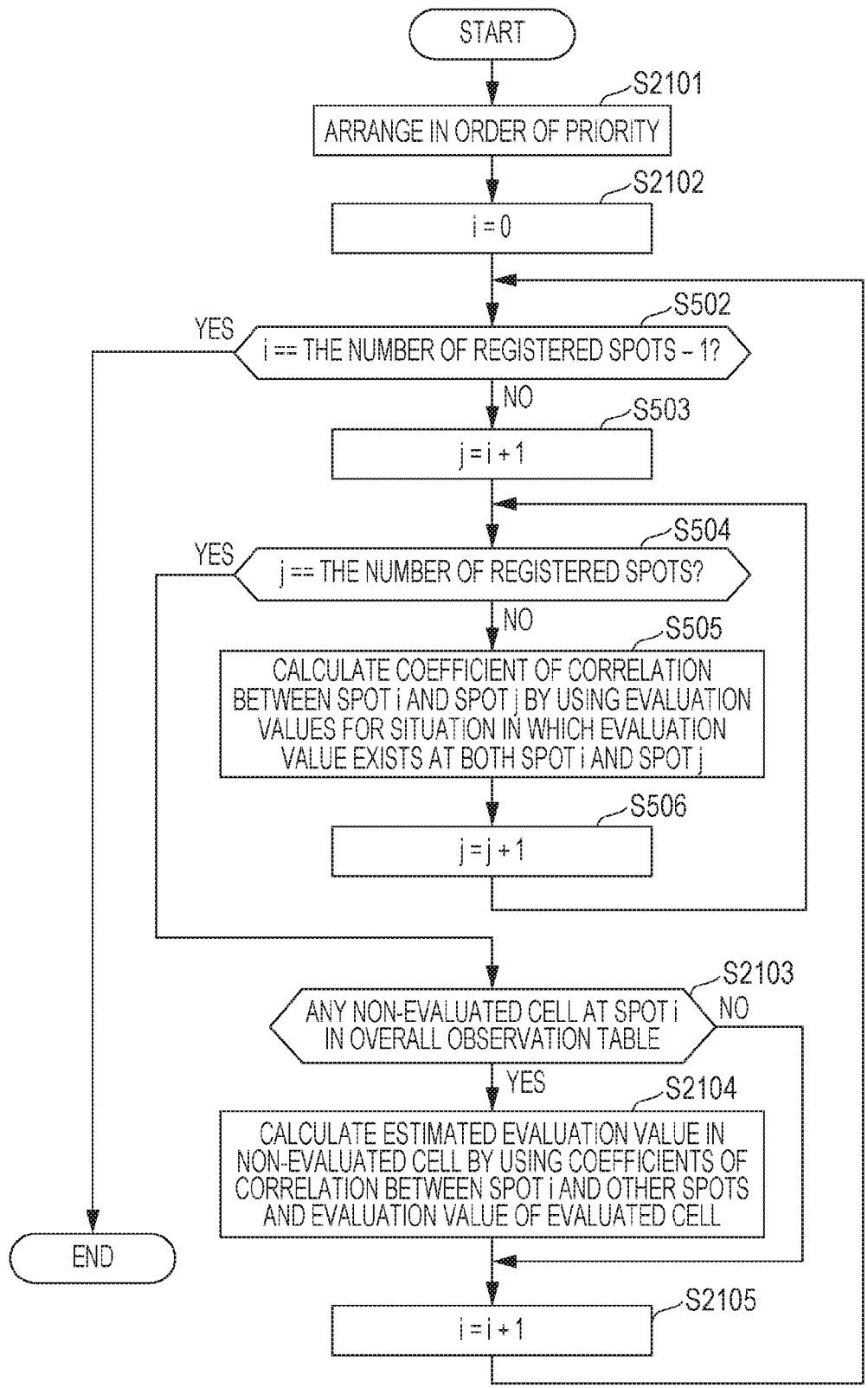
FIG. 21 is a flow chart illustrating an example of a processing procedure for recording an estimated evaluation value in an overall estimation table in accordance with priority in the risk information processing system according to Embodiment 3.

FIG. 21 is a flow chart illustrating an example of a processing procedure for recording estimated evaluation values in the overall estimation table in accordance with priority in the risk information processing system 120 according to Embodiment 3.

As illustrated in FIG. 21, the priority determining unit 227 determines the order of priority that is the order of calculation of estimated evaluation values in non-evaluated cells at respective spots in the overall observation table by referring to the event frequency table stored in the storage unit 225. The priority determining unit 227 arranges the estimated evaluation values in the non-evaluated cells at the respective spots in the overall observation table in the determined order of priority (Step S2101). In this example, the priority determining unit 227 determines that the estimated evaluation values in the non-evaluated cells at the respective spots are calculated in the order of descending amount of traffic at the spots. Specifically, the priority determining unit 227 arranges the estimated evaluation values in the non-evaluated cells at the respective spots in the order of priority by assigning a spot of a larger amount of traffic to a smaller value of i.

Next, the managing unit 222 starts processing from a spot i=0 among rows of spots registered in the overall observation table (Step S2102).

Next, the managing unit 222 performs the same processing as that in Steps S502 through S506 of FIG. 5 of Embodiment 1.

In a case where it is determined that coefficients of correlation of degrees of risk between a spot i registered in the overall observation table and all the other spots j have been calculated in Step S504 (Yes in Step S504), the managing unit 222 proceeds to Step S2103.

Then, the managing unit 222 determines whether or not there is a non-evaluated cell among cells of the respective situations at the spot i (Step S2103).

In a case where it is determined that there is a non-evaluated cell among cells of the respective situations at the spot i (Yes in Step S2103), the managing unit 222 instructs the computing unit 204 to calculate an estimated evaluation value in the non-evaluated cell. In accordance with the instruction from the managing unit 222, the computing unit 204 calculates the estimated evaluation value in the non-evaluated cell by using coefficients of correlation of degrees of risk between the spot i and the other spots and evaluation values at the other spots in a column of a situation for which the non-evaluated cell exists (Step 32104). The managing unit 222 causes the evaluation values of the overall observation table to be stored in corresponding cells of the overall estimation table as they are and causes the estimated evaluation value calculated by the computing unit 204 to be stored in a corresponding cell of the overall estimation table.

The managing unit 222 increments i (Step S2105) and returns to Step S502, and then the processing is repeated.

The processing procedure for recording an estimated evaluation value in the overall estimation table in accordance with the determined order of priority in the risk information processing system 120 has been described above. That is, the risk information processing system 120 determines the order of processing of a plurality of spots by using the event frequency table as frequency information and then determines, in accordance with the determined order of processing, first risk information which is an evaluation value in a non-evaluated cell to be processed.

FIG. 22 is a diagram illustrating an example of the event frequency table stored in the storage unit 225 according to Embodiment 3.

In the present embodiment, the amount of traffic at each spot is used as an event whose frequency is recorded. However, the number of accidents at each spot may be used. In this case, for example, it is determined that processing is performed starting from a spot at which the number of accidents is largest.

The present embodiment may be combined with Embodiment 2, and the number of times of driving of each driver may be used. In this case, for example, it is determined that an individual estimation table is generated starting from a driver whose number of times of driving is largest. That is, in this case, the storage unit stores therein frequency information in which frequencies of driving of respective drivers are associated with the respective drivers, and the risk information processing system determines the order of processing of a plurality of drivers by using the frequency information and then determines an individual estimation table to be processed in accordance with the determined order of processing in calculation of an evaluation value in a non-evaluated cell of an individual estimation table which is individual risk information.

The operation of the risk information processing system 120 according to the present embodiment has been described above.

Effects

The risk information processing system 120 according to the present embodiment can obtain, from combinations of spots and situations (i.e., evaluated cells) for which an evaluation value has been acquired, a degrees of risk (an evaluation value indicative of occurrence or non-occurrence of a risk event) at a spot (i.e., a non-evaluated cell) for which sensor data has not been acquired. This allows the risk information processing system 120 to acquire degrees of risk (evaluation values indicative of occurrence or non-occurrence of a risk event) without actually acquiring all sensing data for all of managed combinations of spots and situations.

Furthermore, the risk information processing system 120 can obtain an estimated evaluation value at a spot with higher priority such as a spot at which the amount of traffic is large without waiting for update of all non-evaluated values of the overall estimation table.

Embodiment 4

Figure 23:
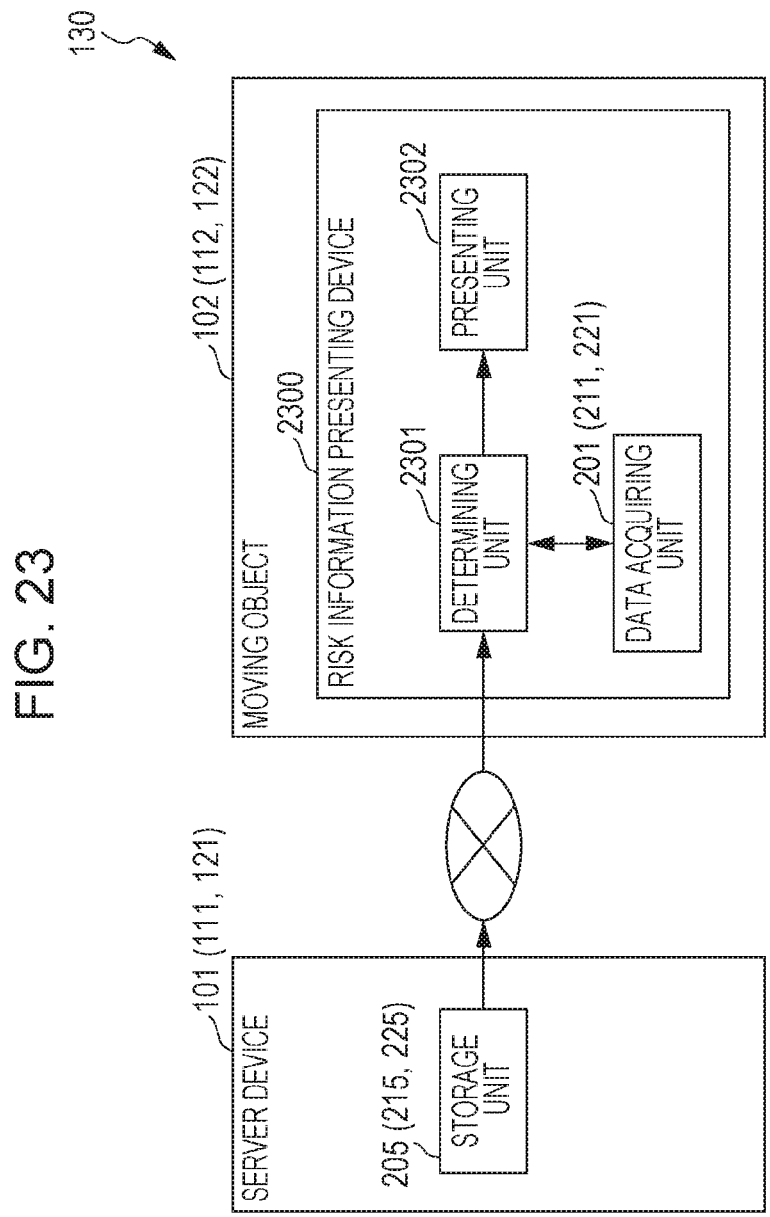
FIG. 23 is a block diagram illustrating an example of a configuration of a risk information processing system that achieves a risk information processing method according to Embodiment 4.

FIG. 23 is a block diagram illustrating an example of a configuration of a risk information processing system that achieves a risk information processing method according to Embodiment 4. In a risk information processing system 130 illustrated in FIG. 23, a server device 101 (111, 121) that has a function of a risk information processing device described in any of Embodiments 1 through 3 and a moving object 102 (112, 122) having a function of a risk information presenting device are connected over a network. That is, any of the server devices 101, 111, and 121 and any of the moving objects 102, 112, and 122 described in Embodiments 1 through 3 may be combined in the risk information processing system 130.

The overall estimation table described in any of Embodiments 1 through 3 is stored in a storage unit 205 (215, 225) of the server device 101 (111, 121).

A risk information presenting device 2300 includes a data acquiring unit 201 (211, 221), a determining unit 2301, and a presenting unit 2302. In FIG. 23, the risk information presenting device 2300 is part of the moving object 102 (112, 122).

The data acquiring unit 201 and the storage unit 205 (215, 225) have the same functions as those in Embodiments 1 through 3, and therefore description thereof is omitted.

Note that a case where the server device 101 and the moving object 102 are combined in the risk information processing system 130 is described below.

The determining unit 2301 receives positional information and sensor data from the data acquiring unit 201. The determining unit 2301 acquires an evaluation value (including an estimated evaluation value) that is a degree of risk for a combination of a spot indicated by the received positional information and a situation indicated by the received sensor data from an overall estimation table stored in the storage unit 205 of the server device 101. The determining unit 2301 associates the spot indicated by the received positional information with a row of a spot in the overall estimation table and associates the situation indicated by the received sensor data with a column of a situation in the overall estimation table.

Next, the determining unit 2301 compares the acquired evaluation value with a threshold value that is held in advance and determines whether or not to present information such as warning on the basis of the result of comparison. Specifically, the determining unit 2301 determines whether or not the acquired evaluation value exceeds the threshold value that is held in advance. Then, in a case where it is determined that the acquired evaluation value exceeds the threshold value that is held in advance, the determining unit 2301 determines that warning is presented. Meanwhile, in a case where it is determined that the acquired evaluation value does not exceed the threshold value that is held in advance, the determining unit 2301 determines that warning is not presented.

The presenting unit 2302 presents information to a user. The presenting unit 2302 presents information such as warning to a driver of the moving object 102 by using a display, a speaker, or lighting or blinking of illumination such as an LED. Specifically, in a case where the determining unit 2301 determines that warning is presented, the presenting unit 2302 presents information based on the evaluation value used for the determination to the driver of the moving object 102.

The configuration of the risk information presenting device 2300 according to the present embodiment has been described above.

Operation of the risk information presenting device according to the present embodiment is described below.

Figure 24:
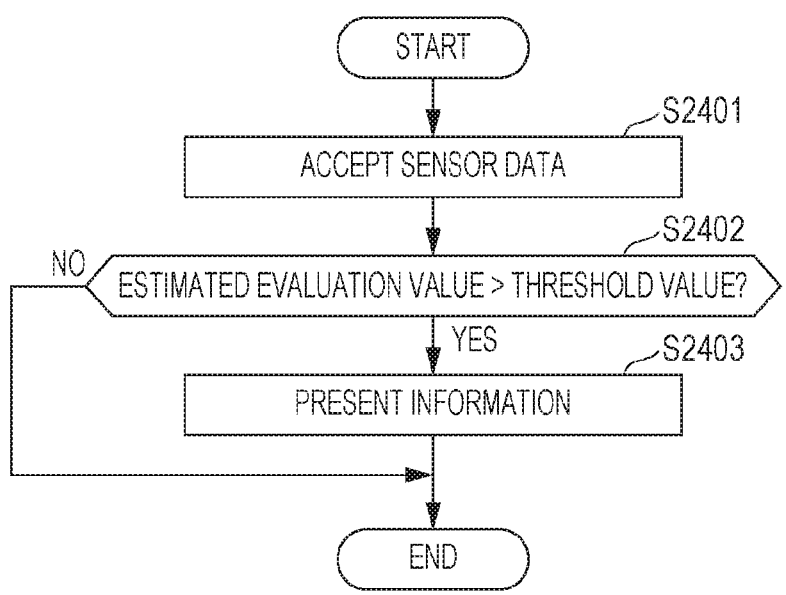
FIG. 24 is a flow chart illustrating an example of a processing procedure in the risk information presenting device according to Embodiment 4.

FIG. 24 is a flow chart illustrating an example of a processing procedure in the risk information presenting device 2300 according to Embodiment 4.

As illustrated in FIG. 24, the determining unit 2301 first receives positional information and sensor data from the data acquiring unit 201 (Step S2401).

Next, the determining unit 2301 refers to the storage unit 205 of the server device 101, acquires an evaluation value recorded in a cell of the overall estimation table that corresponds to a row of a spot indicated by the received positional information and a column of a situation indicated by the received sensor data, and then determined whether or not the acquired evaluation value exceeds a threshold value (Step S2402).

In a case where it is determined that the evaluation value exceeds the threshold value (Yes in Step S2402), the determining unit 2301 causes the presenting unit 2302 to present information such as warning based on the evaluation value (Step S2403). In a case where it is determined that the estimated evaluation value does not exceed the threshold value (No in Step S2402), the determining unit 2301 finishes the processing.

The operation of the risk information processing system 130 according to the present embodiment has been described above.

Note that the threshold value may be a predetermined value or may be an average of evaluation values.

Note that the presenting unit 2302 may not only directly present information to a user, but also indirectly present information to a user by outputting operation information of a moving object (e.g., a vehicle) as a control signal of the moving object. For example, in a case where the evaluation value is large when the speed of the vehicle is high at a certain spot, the presenting unit 2302 may decelerate or stop the vehicle. In a case where the evaluation value is large when the speed of the vehicle is equal to or lower than a certain value at a certain spot, the presenting unit 2302 may accelerate the vehicle. In a case where the evaluation value is large when there is a bicycle on the left of the vehicle at a certain spot, the presenting unit 2302 may steer the vehicle to the right.

The determining unit 2301 may be provided in the server device. In this case, the determining unit 2301 may be arranged to determine whether or not to transmit information such as warning based on the evaluation value to the presenting unit of the moving object in accordance with the result of determination.

Effects

The risk information processing system 130 according to the present embodiment can obtain, from combinations of spots and situations (i.e., evaluated cells) for which an evaluation value has not been acquired, a degree of risk (an evaluation value indicative of occurrence or non-occurrence of a risk event) at a spot (i.e., a non-evaluated cell) at which sensor data has not been acquired. This allows the risk information processing system 130 to present information based on a degree of risk (an evaluation value indicative of occurrence or non-occurrence of a risk event) without actually acquiring all sensing data for all managed combinations of spots and situations. It is therefore possible to notify a user who is driving of a degree of risk at a current spot in real time.

Modifications

The present disclosure has been described based on the embodiments and the modifications thereof. Needless to say, however, the present disclosure is not limited to the embodiments and the like described above. The following cases are also encompassed within the present disclosure.

(1) The technique described in the above embodiments can be realized, for example, by the following types of cloud services. However, the types for realizing the technique described in the above embodiments are not limited to the following types.

Service Type 1: In-House Data Center Type

FIG. 26 illustrates Service Type 1 (In-House Data Center Type). In this type, the service provider C120 acquires information from the group C100 and provides a service to a user. In this type, the service provider C120 has a function of a data center management company. That is, the service provider C120 has the cloud server C111 that manages big data. Accordingly, there is no data center management company.

In this type, the service provider C120 runs and manages a data center (the cloud server C111) (C203). Furthermore, the service provider C120 manages an OS (C202) and an application (C201). The service provider C120 provides a service by using the OS (C202) and the application (C201) managed in the service provider C120 (C204).

Service Type 2: IaaS Type

Figure 27:
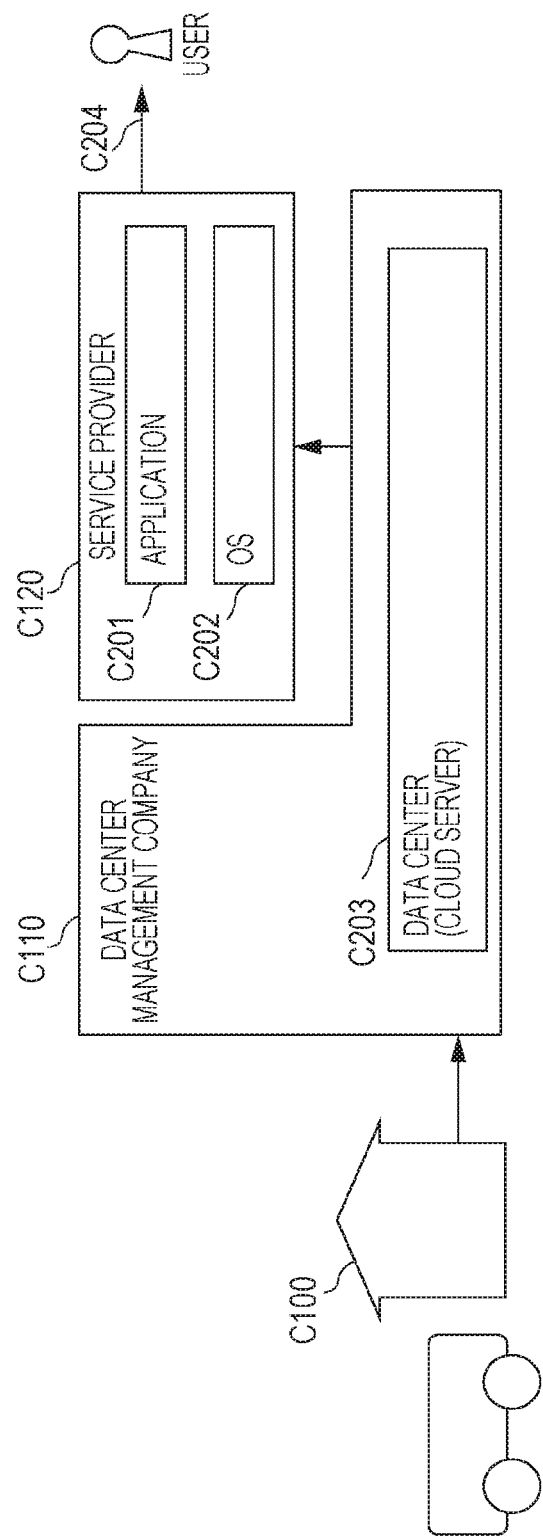
FIG. 27 is an overall view illustrating an example of a risk information processing system.

FIG. 27 illustrates Service Type 2 (IaaS Type). IaaS is an abbreviation of Infrastructure as a Service and is a cloud service providing model that provides an infrastructure itself for construction and operation of a computer system as a service via the Internet.

In this type, a data center management company manages a data center (the cloud server C111) (C203). Furthermore, the service provider C120 manages an OS (C202) and an application (C201). The service provider C120 provides a service by using the OS (C202) and the application (C201) managed in the service provider C120 (C204).

Service Type 3: PaaS Type

Figure 28:
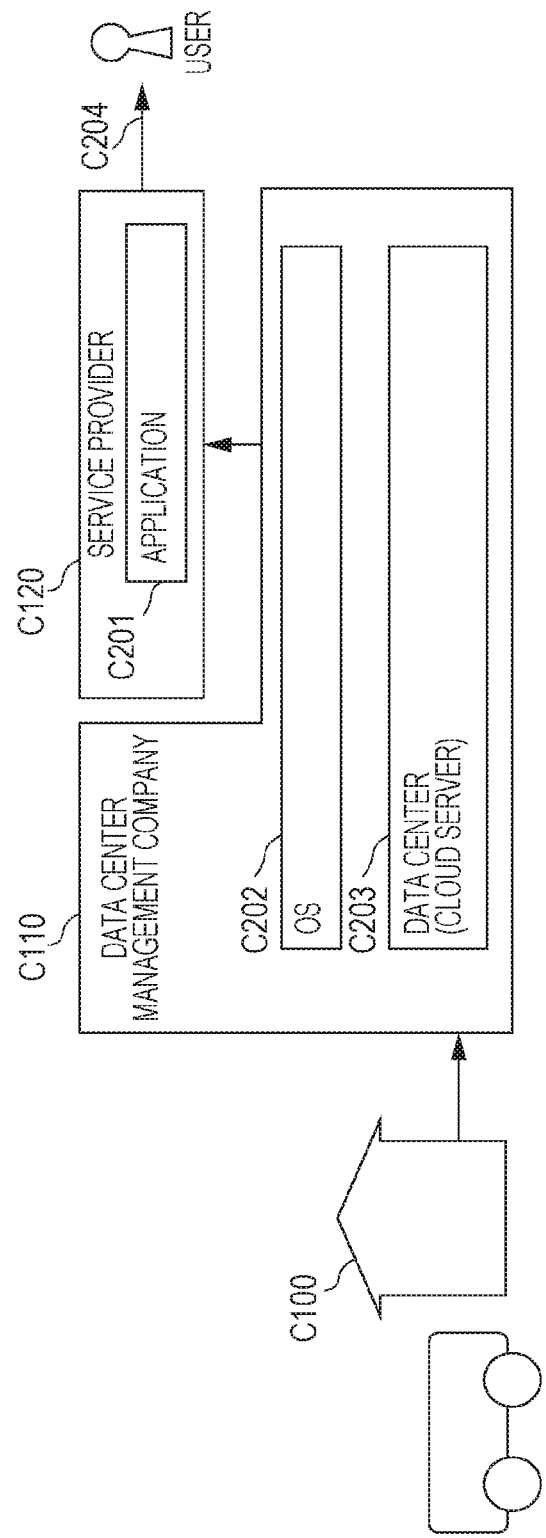
FIG. 28 is an overall view illustrating an example of a risk information processing system.

FIG. 28 illustrates Service Type 3 (PaaS Type). PaaS is an abbreviation of Platform as a Service and is a cloud service providing model that provides a platform for construction and operation of software as a service via the Internet.

In this type, the data center management company C110 manages an OS (C202) and runs and manages a data center (the cloud server C111) (C203). Furthermore, the service provider C120 manages an application (C201). The service provider C120 provides a service by using the OS (C202) managed by the data center management company and the application (C201) managed by the service provider C120 (C204).

Service Type 4: SaaS Type

Figure 29:
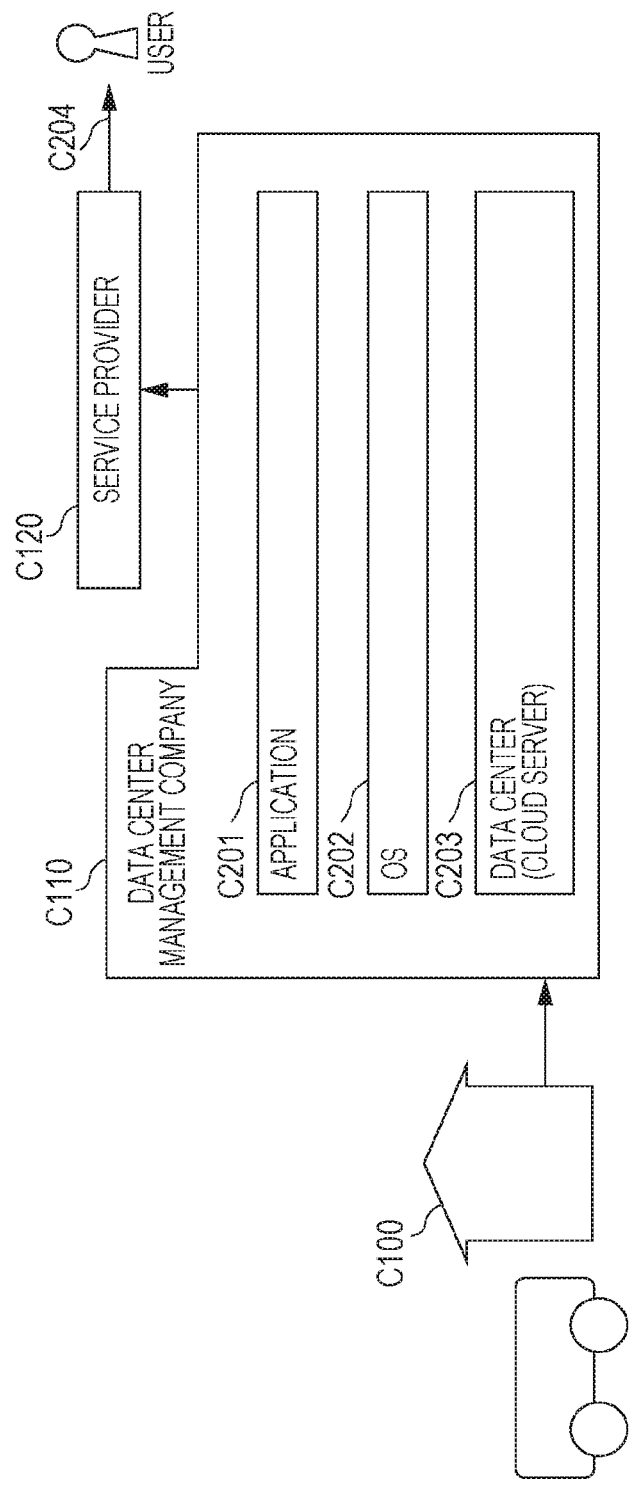
FIG. 29 is an overall view illustrating an example of a risk information processing system.

FIG. 29 illustrates Service Type 4 (SaaS Type). SaaS is an abbreviation of Software as a Service. For example, SaaS is a cloud service providing model that allows a company or an individual (a user) that does not have a data center to use an application provided by a platform provider that has a data center (a cloud server) over a network such as the Internet.

In this type, the data center management company C110 manages an application (C201) and an OS (C202) and runs and manages a data center (the cloud server C111) (C203). The service provider C120 provides a service by using the OS (C202) and the application (C201) managed by the data center management company C110 (C204).

In any of the types described above, it is assumed that the service provider C120 provides a service. For example, the service provider or the data center management company may develop an OS, an application, a database of big data, or the like by itself or may outsource development of an OS, an application, a database of big data, or the like to a third party.

(2) A moving object may be any mobile apparatus including a data acquiring unit such as a four-wheel vehicle (automobile), a two-wheel vehicle, a bicycle, a train, an airplane, a mobile phone, a tablet, a notebook computer, or a wearable device.

(3) The data acquiring unit may be any apparatus, sensor, or the like that has a function of sensing an inside or a periphery of a moving object, an inside or a periphery of an observation device, or a situation. For example, the data acquiring unit may be a GPS (Global Positioning System) that acquires positional information, an on-board camera, a laser radar, a millimeter-wave radar, a sonar, an infrared camera, a road-surface condition sensor, a sleepiness sensor, a weather sensor, CAN (Controller Area Network) information acquiring means, time information acquiring means, inter-vehicle communication information means, roadside-to-vehicle communication information means, communication means, or the like. The positional information may not only be acquired from a GPS, but also be acquired by estimation from the intensity of reception electric field of Wi-Fi, mobile phone communication, or the like. The data acquiring unit may be a sensor including means for recognizing information of a periphery or an inside of a vehicle, or the like. For example, the presence or absence of a vehicle ahead may be determined or a distance to the vehicle ahead may be measured by using an on-board camera. The number of pedestrians within a certain distance may be measured by using an on-board camera, a millimeter-wave radar, or the like. The presence or absence of road surface freezing may be determined by using a road surface condition sensor. Whether it is rainy or not may be measured by a weather sensor. A driver may be specified by sensing a smartphone, a key of a vehicle, a driving license, or the like of the driver. A driver may be specified from a physical characteristic of the driver such as a fingerprint, a palm print, a pupil of an eye, or a voiceprint. The kind of sensor data is not limited to a specific one and may be one obtained by sensing a method of driving operation or may be one obtained by sensing operation of another apparatus or contents of the operation.

(4) In the above description, an estimated evaluation value is calculated by using evaluation values of columns of respective situations at other spots after calculating coefficients of correlation of degrees of risk between spots. On the contrary, an estimated evaluation value may be calculated by using evaluation values of rows of respective spots in other situations after calculating coefficients of correlation of degrees of risk between situations. That is, in estimation of an evaluation value in a first cell that is not evaluated, a degree of risk in the first cell may be calculated from an evaluation value in a second cell by using correlation of degrees of risk between situations calculated by using an evaluation value in a third cell and an evaluation value in a fourth cell. The second cell is a cell corresponding to a combination whose spot is the same as the first cell and whose situation is different from the first cell. The third cell is a cell corresponding to a combination whose situation is the same as the first cell and whose spot is different from the first cell. The fourth cell is a cell corresponding to a combination whose situation is the same as the second cell and whose spot is the same as the third cell.

(5) The term "spot" in the above embodiments refers to a specific location on earth, and the breadth of this term is not limited. A spot may be any information indicative of a specific location on earth such as latitude and longitude information, an address, a road name, or an intersection name.

(6) In the above description, a case where an evaluation value is "3" in a case where an accident occurs, "1" in a case where an accident does not occur, and "2" in the other cases has been described. However, this is merely an example and does not limit the present disclosure. An evaluation value may be a result of evaluation of a risk event other than an accident, such as the presence or absence of a near miss event, the presence or absence of a traffic violation, the presence or absence of sudden braking, a degree of change of an acceleration sensor, a degree of change of a steering, the presence or absence of an evasive maneuver by a driver, and can be any evaluation value indicative of a risk event. Values other than "3", "2", and "1" may be used as evaluation values. In the above description, an evaluation value is determined depending on the presence or absence of a risk event. However, an evaluation value may be determined depending on the presence of a risk event or the other cases.

(7) In the above description, the event frequency is the amount of traffic. However, the event frequency may be the number of accidents at each spot, may be the number of children on a road, may be determined in accordance with the width of a road, or may be determined in accordance with an intersection, and can be any one indicative of an event or a property by which priority can be determined. Combined with Embodiment 2, the event frequency may be the number of times of driving of each driver.

(8) Each of the devices described above is a computer system that is constituted by a microprocessor, a ROM, a RAM, a hard disc unit, a display unit, and the like. Computer programs are stored in the RAM or the hard disc unit. The microprocessor operates in accordance with the computer programs. Thus, each of the devices accomplishes functions thereof. Each of the computer programs is made up of a plurality of command codes indicative of a command for a computer so that a predetermined function is accomplished.

(9) One or more of the constituent elements constituting each of the devices described above may be realized by a single system LSI (Large Scale Integration). The system LSI is a super-multifunctional LSI produced by integrating a plurality of elements on a single chip. Specifically, the system LSI is a computer system including a microprocessor, a ROM, a RAM, and the like. A computer program is stored in the RAM. The microprocessor operates in accordance with the computer program. Thus, the system LSI accomplishes functions thereof.

(10) One or more of the constituent elements constituting each of the devices described above may be realized by an IC card that can be attached to and detached from the device or a stand-alone module. The IC card or the module is a computer system constituted by a microprocessor, a ROM, a RAM, and the like. The IC card or the module may include the super-multifunctional LSI. The microprocessor operates in accordance with a computer program. Thus, the IC card or the module accomplishes functions thereof. The IC card or the module may have tamper resistance.

(11) The present disclosure may be the methods described above. The present disclosure may be a computer program that achieves these methods by a computer or may be a digital signal made up of the computer program.

The present disclosure may be a computer-readable non-transitory recording medium such as a flexible disc, a hard disc, a CD-ROM, an MO, a DVD, a DVD-ROM, a DVD-RAM, a BD (Blu-ray Disc (Registered Trademark), or a semiconductor memory, in which the computer program or the digital signal is stored. Alternatively, the present disclosure may be the digital signal stored in these recording media.

The present disclosure may be the computer program or the digital signal transmitted via an electrical communication line, a wireless or wired communication line, a network represented by the Internet, data broadcasting, or the like.

The present disclosure may be a computer system including a microprocessor and a memory, the memory storing therein the computer program and the microprocessor operating in accordance with the computer program.

The program or the digital signal may be executed by another independent computer system by recording the program or the digital signal on the recording medium and delivering the recording medium or by delivering the program or the digital signal via the network or the like.

(12) The embodiments and the modifications may be combined.

The present disclosure is applicable, for example, to a risk information processing method, a server device, and the like that determine a spot at which the possibility of occurrence of an accident is high during driving and warns a driver.

The invention claimed is:

1. A risk information processing method used in a risk information processing system that manages a degree of risk of the occurrence of an event at a target spot at which a moving object is located, comprising:
   receiving, via a receiver of the risk information processing system, sensor data, which is collected at each of two or more spots different from the target spot;
   determining, via a processor of the risk information processing system, a degree of risk of the occurrence of at least one event at each of the two or more spots from the sensor data collected at each of the two or more spots,
   wherein, the sensor data indicates the occurrence of the at least one event,
   wherein
      the degree of risk of the occurrence of the at least one event at each of the two or more spots is determined based on whether a risk event at a corresponding one of the two or more spots occurs when the sensor data is collected at the corresponding one of the two or more spots, and
      the degree of risk of the occurrence of the at least one event at each of the two or more spots is represented by a value indicating whether the at least one event at the corresponding one of the two or more spots is the risk event;
   storing, as risk information in a memory of the risk information processing system, the determined degree of risk of the occurrence of the at least one event at each of the two or more spots;
   estimating, via the processor, first risk information associated with the target spot without sensor data of a first one of the at least one event at the target spot, by using the risk information stored in the memory, the first risk information being a degree of risk of the occurrence of the first one of the at least one event at the target spot; and
   transmitting, by a transmitter of the risk information processing system, information for the target spot based on the estimated first risk information,
   wherein the first risk information is estimated using second risk information, third risk information, and fourth risk information which are stored as the risk information in the memory,
   wherein the second risk information
      indicates a degree of risk of the occurrence of a second one of the at least one event at the target spot, the second one of the at least one event being different from the first one of the at least one event, and
      is determined in the determining operation based on whether the risk event at the target spot occurs when, as the sensor data at the target spot, sensor data of the second one of the at least one event is collected at the target spot,
   wherein the third risk information
      indicates a degree of risk of the occurrence of the first one of the at least one event at the one of the two or more spots, and
      is determined in the determining operation based on whether the risk event at the one of the two or more spots occurs when, as the sensor data at the one of the two or more spots, sensor data of the first one of the at least one event is collected at the one of the two or more spots, and
   wherein the fourth risk information
      indicates a degree of risk of the occurrence of the second one of the at least one event at the one of the two or more spots, and
      is determined in the determining operation based on whether the risk event at the one of the two or more spots occurs when, as the sensor data at the one of the two or more spots, the sensor data of the second one of the at least one event is collected at the one of the two or more spots.

2. The risk information processing method according to claim 1, wherein the risk information processing system manages the degree of risk of the occurrence of the risk event affecting a vehicle at the target spot,
   wherein, the risk event includes at least one of the following events,
      a) an accident involving the vehicle,
      b) a near miss of a collision of the vehicle,
      c) a traffic violation incurred by a driver of the vehicle,
      d) sudden braking of the vehicle,
      e) a change in output of an acceleration sensor of the vehicle,
      f) a change in steering of the vehicle, and
      g) an evasive maneuver by a driver of the vehicle.

3. The risk information processing method according to claim 1, wherein in the estimating operation, correlation of degrees of risk between the degree of risk of the occurrence of the risk event at target spot and the degree of risk of the occurrence of the risk event at the one of two or more spots different from the target spot is calculated via the processor by using the second risk information and the fourth risk information, and the degree of risk of the first risk information is calculated, via the processor, from the degree of risk of the third risk information by using the calculated correlation of the degrees of risk between the degree of risk of the occurrence of the risk event at the target spot and the degree of risk of the occurrence of the risk event at the one of the two or more spots different from the target spot.

4. The risk information processing method according to claim 1, wherein
   in the estimating operation, correlation of degrees of risk between the occurrence of a first risk event and the occurrence of a second risk event is calculated via the processor by using the third risk information and the fourth risk information, and
   the degree of risk of the first risk information is calculated, via the processor, from the degree of risk of the second risk information by using the calculated correlation of degrees of risk between the occurrence of the first risk event and the occurrence of the second risk event.

5. The risk information processing method according to claim 1, wherein the first risk information obtained in the estimating operation is stored in the memory of the risk information processing system.

6. The risk information processing method according to claim 1, further comprising:
   storing, in the memory of the risk information processing system as individual risk information for an individual driver and as overall risk information for all drivers, a degree of risk associated with the individual driver that is input for a combination of a spot and an occurrence of the risk event;
   calculating, via the processor, correlation of degrees of risk between the individual risk information and the overall risk information; and
   calculating, via the processor, a degree of risk of the individual risk information from the degree of risk of the overall risk information by using the calculated correlation of degrees of risk between the individual risk information and the overall risk information.

7. The risk information processing method according to claim 3, further comprising:
   storing, in the memory of the risk information processing system, frequency information in which frequencies of a traffic event and spots are associated with each other;
   determining, via the processor, an order of processing of the spots by using the frequency information; and
   determining, via the processor, the first risk information to be processed in accordance with the determined order of processing.

8. The risk information processing method according to claim 6, further comprising:
   storing, in the memory of the risk information processing system, frequency information in which frequencies of driving of a plurality of drivers of all the drivers and the individual driver are associated with each other;
   determining, via the processor, an order of processing of the plurality of drivers by using the frequency information; and
   determining, via the processor, the individual risk information to be processed in accordance with the determined order of processing in the calculating the degree of risk of the individual risk information.

9. The risk information processing method according to claim 1, further comprising:
   receiving, via the receiver, positional information indicative of a current position and sensor data, indicative of the occurrence of a current risk event, from the moving object;
   acquiring, via the processor, a degree of risk for the occurrence of the current risk event for a combination of a spot indicated by the received positional information and the current risk event indicated by the sensor data from the memory of the risk information processing system; and
   transmitting, via the transmitter, risk information based on the acquired degree of risk associated with the moving object.

10. The risk information processing method according to claim 9, further comprising:
    in a case where the acquired degree of risk exceeds a threshold value that is stored in advance, determining, via the processor, that a warning is presented, and transmitting, via the transmitter, the risk information based on the acquired degree of risk associated with the moving object; and in a case where the acquired degree of risk is equal to or lower than the threshold value, determining, via the processor, that the warning is not presented, and transmitting no information based on the acquired degree of risk associated with the moving object.

11. A system comprising:
    a plurality of sensors configured to collect sensor data at each of two or more spots; and
    a server device that manages a degree of risk of the occurrence of at least one event at a target spot, the server device comprising:
       a receiver that receives the sensor data which is collected at each of the two or more spots by the plurality of sensors;
       a transmitter; and
       a processor that
          1) determines a degree of risk of the occurrence of the at least one event at each of the two or more spots from the sensor data collected at each of the two or more spots,
       wherein the sensor data indicates the occurrence of the at least one event,
       wherein
          the degree of risk of the occurrence of the at least one event at each of the two or more spots is determined based on whether a risk event at a corresponding one of the two or more spots occurs when the sensor data is collected at the corresponding one of the two or more spots, and
          the degree of risk of the occurrence of the at least one event at each of the two or more spots is represented by a value indicating whether the at least one event at the corresponding one of the two or more spots is the risk event;
          2) stores, as risk information in a memory of the system, the determined degree of risk associated with each of the two or more spots; and
          3) estimates first risk information associated with the target spot without sensor data of a first one of the at least one event at the target spot, by using the risk information stored in the memory of the system, the first risk information being a degree of risk of the occurrence of the first one of the at least one event at the target spot; and
    wherein the transmitter transmits information for the target spot based on the estimated first risk information,
    wherein the second risk information
       indicates a degree of risk of the occurrence of a second one of the at least one event at the target spot, the second one of the at least one event being different from the first one of the at least one event, and
       is determined in the determining operation based on whether the risk event at the target spot occurs when, as the sensor data at the target spot, sensor data of the second one of the at least one event is collected at the target spot,
    wherein the third risk information
       indicates a degree of risk of the occurrence of the first one of the at least one event at the one of the two or more spots, and
       is determined in the determining operation based on whether the risk event at the one of the two or more spots occurs when, as the sensor data at the one of the two or more spots, sensor data of the first one of the at least one event is collected at the one of the two or more spots, wherein the fourth risk information
- indicates a degree of risk of the occurrence of the second one of the at least one event at the one of the two or more spots, and
- is determined in the determining operation based on whether the risk event at the one of the two or more spots occurs when, as the sensor data at the one of the two or more spots, the sensor data of the second one of the at least one event is collected at the one of the two or more spots.

* * * * *